US012581549B2

(12) United States Patent
Sharma et al.

(10) Patent No.: US 12,581,549 B2
(45) Date of Patent: Mar. 17, 2026

(54) METHOD AND APPARATUS FOR MEASUREMENT MODE SELECTION PROCEDURE IN COMMUNICATION SYSTEM INCLUDING MULTIPLE TRANSMISSION AND RECEPTION POINTS

(71) Applicant: Samsung Electronics Co., Ltd., Suwon-si (KR)

(72) Inventors: Neha Sharma, Bangalore (IN); Arvind Ramamurthy, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 248 days.

(21) Appl. No.: 18/360,345

(22) Filed: Jul. 27, 2023

(65) Prior Publication Data

US 2024/0040638 A1     Feb. 1, 2024

Related U.S. Application Data

(63) Continuation of application No. PCT/KR2023/010304, filed on Jul. 18, 2023.

(30) Foreign Application Priority Data

Jul. 28, 2022    (IN) ............................. 202241043369
Jul. 7, 2023    (IN) ............................. 202241043369

(51) Int. Cl.
   H04W 76/10      (2018.01)
   H04W 24/10      (2009.01)
              (Continued)

(52) U.S. Cl.
   CPC ........... H04W 76/10 (2018.02); H04W 76/20 (2018.02)

(58) Field of Classification Search
   CPC ..... H04W 76/10; H04W 76/20; H04W 24/10; H04W 36/0058; H04W 36/0085; H04W 36/0094
   See application file for complete search history.

(56) References Cited

U.S. PATENT DOCUMENTS

2018/0048375 A1    2/2018   Guo et al.
2019/0306739 A1*   10/2019   Kim ...................... H04W 76/27
             (Continued)

FOREIGN PATENT DOCUMENTS

CN     114175517 A     3/2022
EP      3 836 651      6/2021
           (Continued)

OTHER PUBLICATIONS

Ericsson, "Discussions on RRM measurement relaxations", R4-2201864, 3GPP TSG RAN WG4 Meeting #101-bis-e, Jan. 10, 2022, 8 pages.
(Continued)

*Primary Examiner* — Kent Krueger
(74) *Attorney, Agent, or Firm* — NIXON & VANDERHYE P.C.

(57) ABSTRACT

An example method for selecting a measurement mode by a user equipment (UE) in a communication system including multiple transmission and reception points (TRP) scenario includes receiving, from a network entity, system information indicating one or more measurement modes supported by the network entity; selecting a measurement mode among the one or more measurement modes based on one or more UE parameters; transmitting, to the network entity, a radio resource control (RRC) connection request for the selected measurement mode; and receiving, from the network entity in response to the transmitted RRC connection request, a first RRC connection configuration for configuring the UE with the selected measurement mode.

20 Claims, 19 Drawing Sheets

(51) Int. Cl.

| | |
|---|---|
| *H04W 36/00* | (2009.01) |
| *H04W 76/20* | (2018.01) |

(56) References Cited

U.S. PATENT DOCUMENTS

| | | | |
|---|---|---|---|
| 2020/0314674 A1* | 10/2020 | Xu ........................ | H04W 24/10 |
| 2021/0041522 A1 | 2/2021 | Manolakos et al. | |
| 2021/0045003 A1 | 2/2021 | Li et al. | |
| 2021/0218484 A1 | 7/2021 | Yuan et al. | |
| 2021/0288696 A1 | 9/2021 | Jung et al. | |
| 2021/0321446 A1 | 10/2021 | Lee et al. | |
| 2022/0015150 A1* | 1/2022 | Ye ........................ | H04W 24/10 |
| 2022/0217565 A1 | 7/2022 | Thangarasa et al. | |
| 2023/0308253 A1 | 9/2023 | Abotabl et al. | |

FOREIGN PATENT DOCUMENTS

| | | | |
|---|---|---|---|
| WO | 2021/058598 | | 4/2021 |
| WO | 2021254887 | A1 | 12/2021 |
| WO | 2022/035278 | | 2/2022 |

OTHER PUBLICATIONS

International Search Report dated Oct. 24, 2023 for PCT/KR2023/010304, 3 pages.
Written opinion dated Oct. 24, 2023 for PCT/KR2023/010304, 3 pages.
Extended Search Report dated May 20, 2025 in European Application No. 23846891.2.
Examination Report dated Jan. 7, 2026 in Indian Application No. 202241043369 and English-language translation.

* cited by examiner

1000

| Measurement Mode 1/2 |  ~1001

| Network configures the UE with event T3 and T4 |  ~1003

| In Measurement mode 1, UE monitors and reports the event to network |  ~1005

| In Measurement mode 2, UE will choose the right TRP |  ~1007

| In measurement mode1, network moves the UE to the next best TRP |  ~1009

Trigger Measurement reporting due to change of Orientation/Direction

1200

Measurement Mode 3 ~1201

Network configures the
UE with event T5 only ~1203

UE monitors the UL channel quality for
BLER, Pathloss, TX power parameters ~1205

UE sends out event
report when the event occurs ~1207

UE transmits UL SRS ~1209

Network evaluates UE's UL SRS and
moves the UE to the best TRP ~1211

METHOD AND APPARATUS FOR MEASUREMENT MODE SELECTION PROCEDURE IN COMMUNICATION SYSTEM INCLUDING MULTIPLE TRANSMISSION AND RECEPTION POINTS

CROSS-REFERENCE TO RELATED APPLICATIONS

This application is a continuation application of International Application No. PCT/KR2023/010304 designating the United States, filed on Jul. 18, 2023, in the Korean Intellectual Property Receiving Office and claiming priority to Indian Provisional Patent Application No. 202241043369 filed on Jul. 28, 2022 and Indian Complete Patent Application No. 202241043369 filed on Jul. 7, 2023 in the Indian Patent Office, the disclosures of each of which are incorporated by reference herein in their entireties.

BACKGROUND

Field

The disclosure relates to a field of wireless communication networks, and, for example, to a system and method for a measurement mode selection procedure in multi transmission and reception (TRP) scenario in a sixth generation (6G) wireless communication system.

Description of Related Art

In general, several broadband wireless technologies have been developed for providing better applications and services to meet the growing requirements of broadband subscribers. A second generation (2G) wireless communication system has been developed to provide voice services while ensuring mobility of users. A third generation (3G) wireless communication system supports not only a voice service but also a data service. In recent years, a fourth generation (4G) wireless communication system has been developed to provide high-speed data services. However, the 4G wireless communication system suffers from a lack of resources to meet the growing demand for high-speed data services. This problem is solved by the deployment of a fifth generation (5G) wireless communication system to meet the ever-growing demand for high-speed data services. Furthermore, the 5G wireless communication system provides ultra-reliability and supports low latency applications. Research is currently ongoing to define requirements, systems, and frameworks for a sixth generation (6G) wireless communication system that can solve the limitations of the 5G wireless communication system and support enhanced use cases.

In the 5G and 6G wireless communication system, transmission and/or reception in a Terahertz band (THz) system or mm-wave or mid-band system is based on narrow beams that suppress interference from neighboring base stations and extend the range of the THz link. However, due to high path loss, heavy shadowing, and rain attenuation, reliable transmission at higher frequencies is one of the key issues that need to be overcome to make THz band wave systems a practical reality. Multiple transmission and reception (TRP) per cell or cell-less or cell-free architecture can break the conventional design of the cellular system where each cell or area will have multiple TRPs. The multiple TRPs together can form a large geographical area with continuous radio coverage. Each TRP may have one or more logical antennas enabling multiple beams to be formed. From a User Equipment (UE) perspective, the UE is connected to a network as a whole and not to a single cell. The coverage area, cell area, a number of TRPs in a particular area or cell, and boundaries of the multiple TRPs are configurable depending on the network topology, UE distribution, and traffic load situation.

Given the short coverage and narrow beam characteristics of the THz frequency based cellular system, mid-band cellular system, or mm-wave based cellular system, a common system with cell-free architecture is used to provide continuous coverage or service to the UE. Under such a system, a cell can be composed of multiple TRPs on the same carrier/frequency. Further, the UE can be under the service of one or more of such TRPs in both downlink (DL) and/or uplink (UL) directions. From the UE point of view, it is not necessary to distinguish all such serving TRPs or Access Points (AP) with any specific identifier as the serving TRPs or the AP can be just multiple sources of serving beams, and any distinction between multiple TRPs can be achieved at a beam level.

FIGS. 1A and 1B are diagrams 100 and 100' depicting a cell free architecture of a radio network consisting of multiple TRPs, in accordance with prior art. Referring to FIG. 1A, a possible deployment for the cell free architecture is described in which an area or a cell including the multi TRPs is connected to a TRP controller (TRP-C) 101. The TRP-C 101 is connected to a control unit or C-RAN 103. The C-RAN 103 is a Centralized Unit (CU) or functionality of CU and Distributed Unit (DU), which can have radio access network functionality. The C-RAN 103 has a defined area or a region called the cell or C-RAN region. The cell or the C-RAN 103 includes multiple TRPs on the same or different carrier. A user can be served through a single TRP or multiple TRPs. The TRP-C 101 is a network node that communicates with multiple TRPs and the C-RAN 103. The TRP-C 101 controls the multiple TRPs within the cell or region defined by the C-RAN 103. The TRP-C 101 can be an existing network node in the network or can be part of existing network nodes like CU, DU, etc. The THz or high frequency mm wave link, mid-band, or sub 6 GHz can be sensitive and can easily cause issues like blockage, deafness, and handover, and impact the user experience. To have quick recovery between the UE and the network, the UE can decide which TRP or TRPs can serve the UEs. The main functionality of TRP-C 101 includes beam management, switching of master node/decision about the master node, handover intra TRP/and inter TRP, formation of a cluster (list of TRPs serving to the user) for each UE, and addition and deletion of nodes in the cluster.

Referring to FIG. 1B, another possible deployment for cell free architecture is described in which the area or the cell including multi TRPs of the radio network is connected to the control unit or C-RAN 103. In this scenario, the TRP-C 101 is a part of the C-RAN 103. In the architecture of FIG. 1B, multiple TRPs are directly connected with the C-RAN 103 through a wired or wireless interface and are handled by module TRP-C controller part of CU, DU, or the C-RAN 103. The central unit could act as a mobility anchor and a centralized control node for multiple TRPs.

In the existing measurement mechanism for mobility and scheduling, measurement at the UE side is primarily used. As per TS 38.300, measurement performed by the UE for connected mode mobility is classified into at least the following four measurement types:

Intra-frequency New Radio (NR) measurements,

Inter-frequency NR measurements,

Inter-Radio Access Technology (RAT) measurements for Evolved Universal Terrestrial Radio Access (E-UTRA), and Inter-RAT measurements for Universal Terrestrial Radio Access (UTRA).

For each measurement type the UE receives a measurement configuration from the network. The measurement configuration includes one or more measurement objects. The one or more measurement objects may include a carrier frequency to be monitored. Further, for each measurement object one or more reporting configurations may be defined. The reporting configuration defines a reporting criterion (or criteria). In measurement configuration, three reporting criteria are used, i.e., event triggered reporting, periodic reporting, and event triggered periodic reporting. Further, the association between the one or more measurement objects and the one or more reporting configurations is created by a measurement identity. The measurement identity links together one measurement object and one reporting configuration of the same RAT. Further, the UE performs a measurement using a plurality of measurement identities for each of the measurement objects and reporting configuration pair as per the measurement configuration and the reporting criteria. The UE further sends the measurement report to the network to take mobility and scheduling decision.

FIG. 2 is a sequence diagram 200 depicting signaling exchange between a User Equipment (UE) 201 and the radio network 203 for a legacy or existing measurement procedure, in accordance with a prior art. The sequence diagram 200 depicts a series of operation steps 205 through 217.

At step 205, a Radio Resource Control (RRC) connection setup is established between the UE 201 and the radio network 203. At step 207, the UE 201 receives a measurement configuration from the radio network 203. The measurement configuration includes at least one measurement object and the reporting criterion (or criteria). At step 209, the UE 201 performs the measurement based on the measurement configuration. At step 211, the UE 201 transmits a measurement report to the radio network 203 based on the reporting criterion. At step 213, the radio network selects a new TRP within the cell based on the measurement report. At step 215, the UE 201 receives from the radio network 203, a mobility command to switch to the new TRP within the cell. At step 217, the UE 201 starts performing a random-access channel (RACH) procedure on the new TRP within the cell.

The existing measurement procedure is defined for the cellular based system in which each of the measurement configuration and the reporting criterion is configured for each cell. However, in the 6G wireless communication system, there is no cell concept and multiple TRPs will be serving the UE. Considering the density of the TRPs and the line-of-sight nature of 6G signals, the existing measurement mechanism would need frequent measurements and heavy signaling load due to measurement reporting by the UE.

Further, in existing measurement procedures, time delays are involved in switching from one node to another node if the UE is relying on the network for handovers. Furthermore, in the existing measurement procedures, handing out measurement objects for all possible TRPs around the UE is impossible for the network. For handing out the measurement objects, the RRC reconfiguration message will be long and heavy.

Further, the existing measurement procedures do not have a mechanism to account for disruptions to the signals especially mmW and 6G THz signals. Further, the existing measurement procedures do not have a mechanism to account for directional change of the UE. Generally, in the 6G wireless communication system, the UE is very sensitive to direction and even a slight change in UE direction may significantly impact measurement criteria in the existing measurement procedures.

Further, in the 6G wireless communication system, the TRPs operate in a cluster and none of the existing measurement procedures provide means for cluster configuration. Further, none of the existing measurement procedures accommodate separate UL and DL paths for the UE.

Therefore, new measurement mechanisms in multi-TRP scenarios are needed, as the existing measurement mechanisms are not scalable to the above-discussed requirements and limitations.

SUMMARY

This summary is provided to introduce a selection of concepts, in a simplified format, that are further described in the detailed description. This summary is neither intended to identify key or essential concepts of the disclosure nor is it intended for determining the scope of the disclosure.

In an example embodiment, a method for selecting a measurement mode by a user equipment (UE) in a communication system including multiple transmission and reception points (TRPs) is disclosed. The method may include receiving, from a network entity, system information indicating one or more measurement modes supported by the network entity; selecting a measurement mode among the one or more measurement modes based on one or more UE parameters; transmitting, to the network entity, a radio resource control (RRC) connection request for the selected measurement mode; and receiving, from the network entity in response to the transmitted RRC connection request, a first RRC connection configuration for configuring the UE with the selected measurement mode.

In various example embodiments, the method may further include transmitting, to the network entity, UE assistance information indicating a request to change the selected measurement mode when in RRC connected state and receiving, from the network entity in response to the transmitted UE assistance information, a second RRC connection configuration for re-configuring the UE with the changed measurement mode.

In various example embodiments, the one or more UE parameters may include at least one of a mobility parameter associated with the UE, a rotation parameter associated with the UE, a power level of the UE, a thermal level of the UE, and a cluster configuration of the UE. Information corresponding to the cluster configuration of the UE may, for example, indicate whether or not the UE is configured with a cluster of the TRP.

In various example embodiments, the one or more measurement modes may include a first measurement mode, a second measurement mode, a third measurement mode, and a hybrid mode.

In various example embodiments, for selecting the measurement mode among the one or more measurement modes, the method may further include selecting, as the measurement mode, the third measurement mode based on one of a determination that the UE power level is less than a threshold power level, a determination that the UE thermal level is greater than a threshold level, or a determination that the UE is not cluster configured and UE mobility is greater than a threshold value.

In various example embodiments, in the third measurement mode, the method may further include receiving, from the network entity, a measurement configuration; transmitting, to the network entity, UE location information and Uplink Sounding Reference Signal (UL SRS) of the UE; and receiving, from the network entity in response to the transmitted location information and the UL SRS, a mobility command to switch to a new TRP selected by the network entity, wherein a selection of the new TRP is based on the UE location information and the UL SRS.

In various example embodiments, in the third measurement mode, the method may further include receiving, from the network entity, information related to triggering of an event associated with reporting criteria. The information related to the triggering of the event may include information associated with triggering of a first event, and the first event is triggered when an uplink channel quality of the UE becomes less than a threshold channel quality. Further, the method may include reporting the triggered first event to the network entity when the uplink channel quality becomes less than the threshold channel quality and transmitting, to the network entity, the UE location information and the UL SRS upon reporting the triggered first event to the network entity.

In various example embodiments, for selecting the measurement mode among the one or more measurement modes, the method may further include selecting, as the measurement mode, the second measurement mode based on a determination that one of the UE power level is greater than the threshold power level or the UE thermal level is less than the threshold level, and a determination that the UE is cluster configured with the cluster of the TRP.

In various example embodiments, in the second measurement mode, the method may further include receiving, from the network entity, a measurement configuration and cluster information associated with the multiple TRP; determining, and selecting a new TRP among the multiple TRP based on the received measurement configuration and the cluster information; and transmitting, to the network entity, a signal informing a switch of downlink (DL) path to the new TRP.

In various example embodiments, in the second measurement mode, the method may further include receiving, from the network entity, information related to triggering of an event associated with reporting criteria. The information related to triggering of the event may include information associated with triggering of a first event and a second event. The first event may be triggered when a new TRP resource becomes better than a threshold and the second event may be triggered when the new TRP resource becomes offset better than a configured TRP resource. Further, the method may include reporting the triggered first event and the triggered second event to the network entity and transmitting, to the network entity, a signal informing the switch of downlink (DL) path to the new TRP upon reporting the triggered first event and the triggered second event to the network entity.

In various example embodiments, for selecting the measurement mode among the one or more measurement modes, the method may include selecting, as the measurement mode, the hybrid mode based on a determination that one of the UE power level is greater than the threshold power level or the UE thermal level is less than the threshold level, a determination that UE mobility is less than the threshold value, and a determination that the UE is required to be moved in the hybrid mode.

In various example embodiments, for selecting the measurement mode among the one or more measurement modes, the method may further include selecting, as the measurement mode, the first measurement mode based on an unavailability of other measurement modes except the first measurement mode among the one or more measurement modes.

In various example embodiments, in the first measurement mode, the method may further include receiving, from the network entity, a measurement configuration; performing a measurement based on the received measurement configuration; transmitting, to the network entity, the measurement report of the performed measurement; and receiving, from the network entity in response to the transmitted measurement report, a mobility command to switch to a new TRP, wherein the new TRP is selected based on the measurement report.

In an example embodiment, a user equipment (UE) may include a transceiver and at least one processor coupled to the transceiver. The at least one processor may be configured to receive, from a network entity, system information indicating one or more measurement modes supported by the network entity, select a measurement mode among the one or more measurement modes based on one or more UE parameters. transmit, to the network entity, a radio resource control (RRC) connection request for the selected measurement mode, and receive, from the network entity in response to the transmitted RRC connection request, a first RRC connection configuration for configuring the UE with the selected measurement mode.

To further clarify the advantages and features of the disclosure, a more particular description is provide with reference to specific embodiments thereof, which are illustrated in the appended drawings. It is appreciated that these drawings depict only non-limiting, example embodiments and are therefore not to be considered as in any way limiting the scope of the disclosure. The example embodiments will be described and explained with additional specificity and detail in the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, in which.

7

Figure 7:
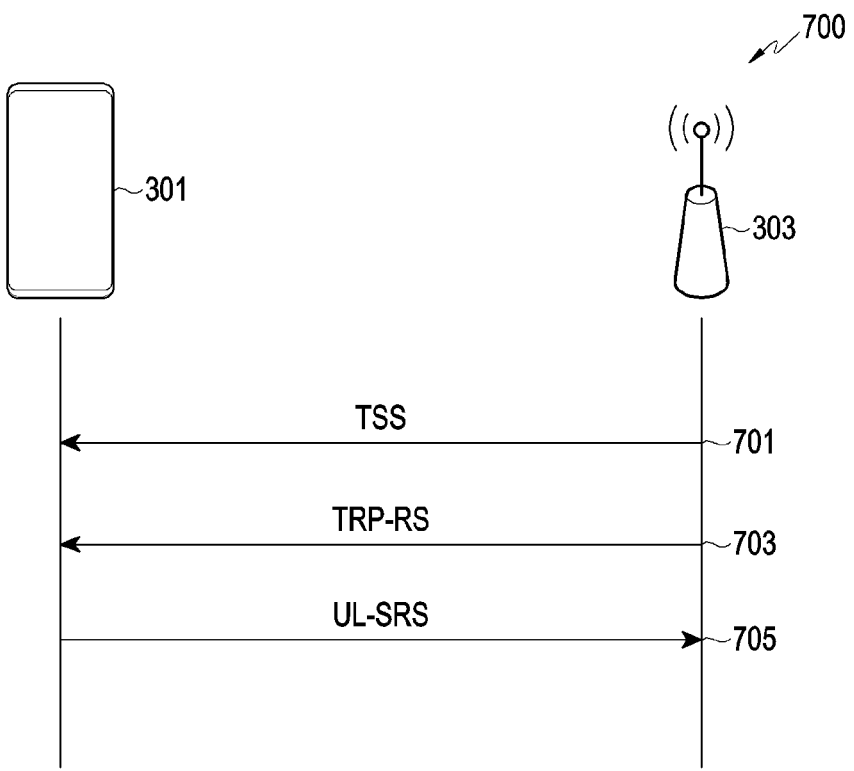
Figure 8:
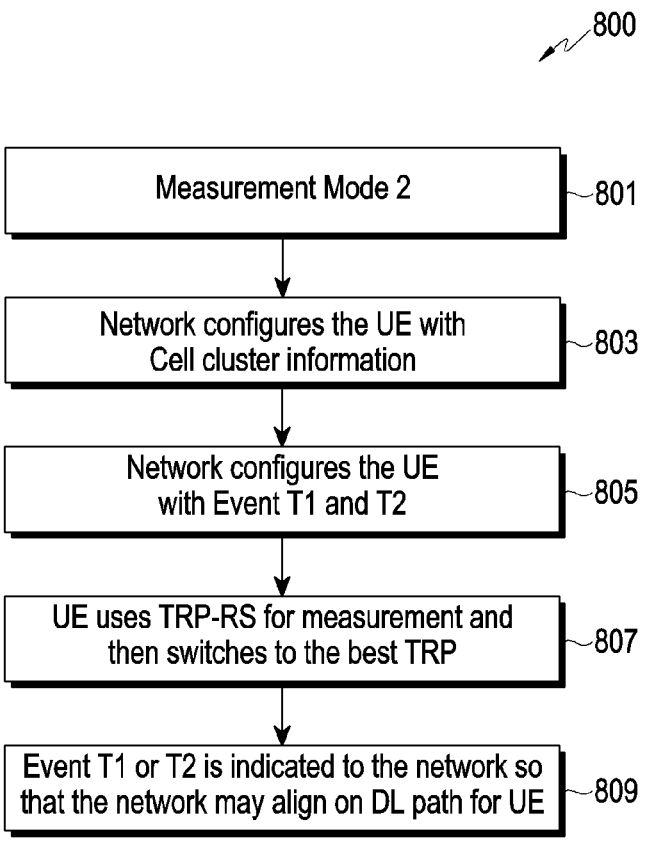
Figure 9:
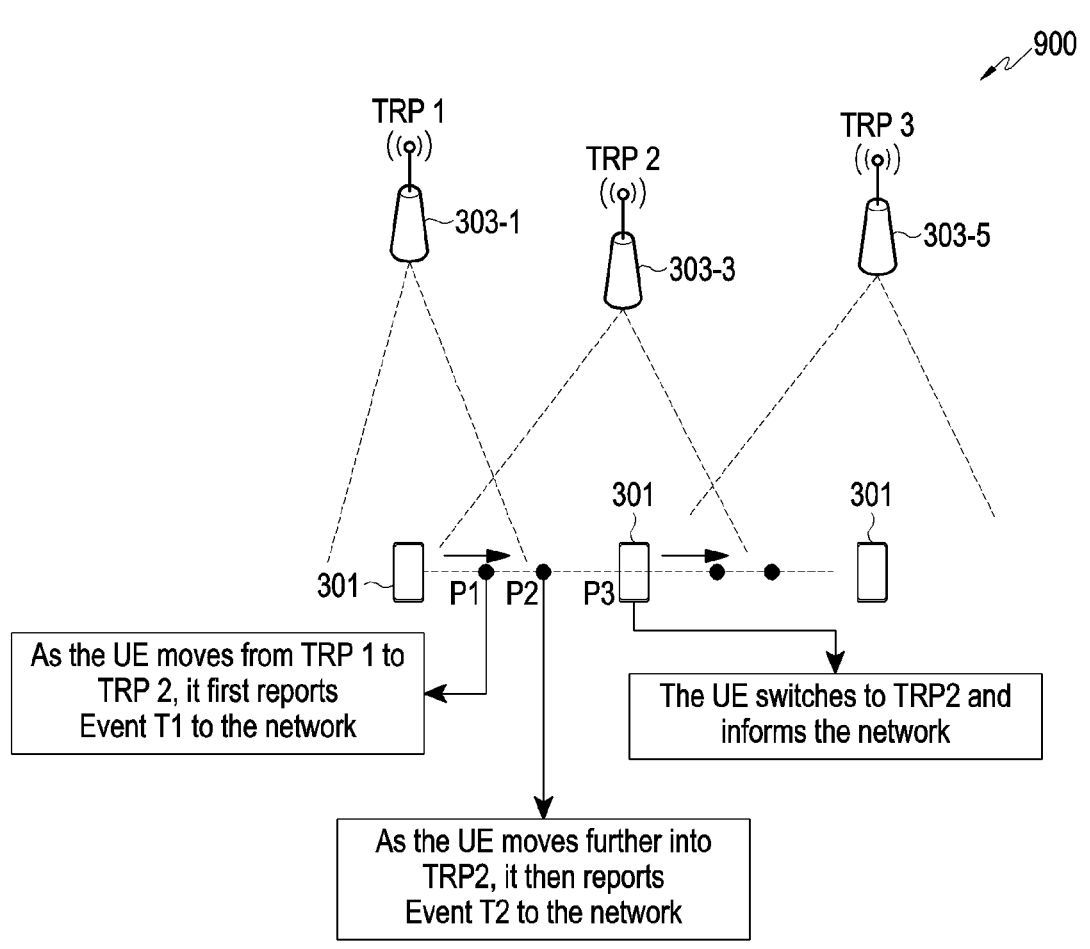
Figure 10:
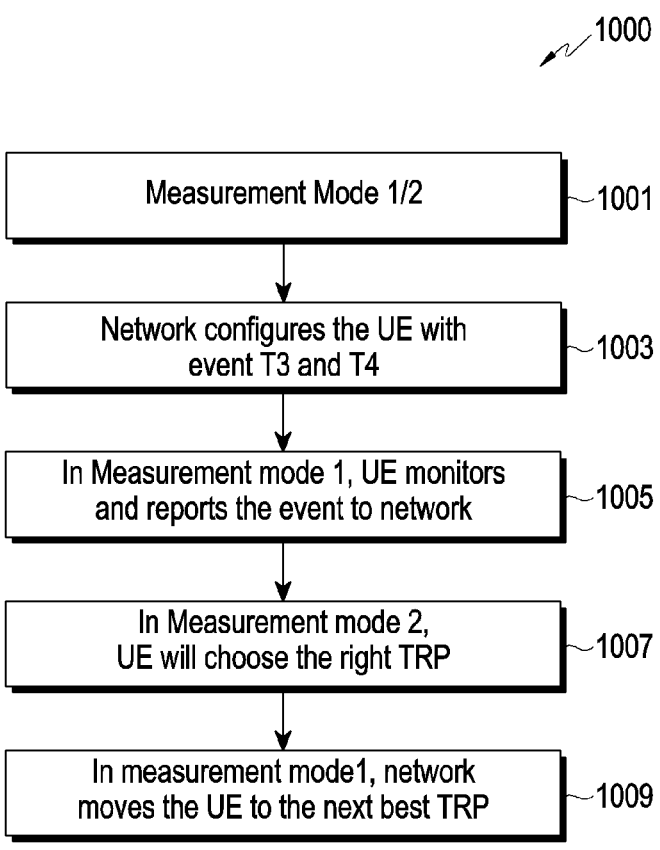
Figure 11A:
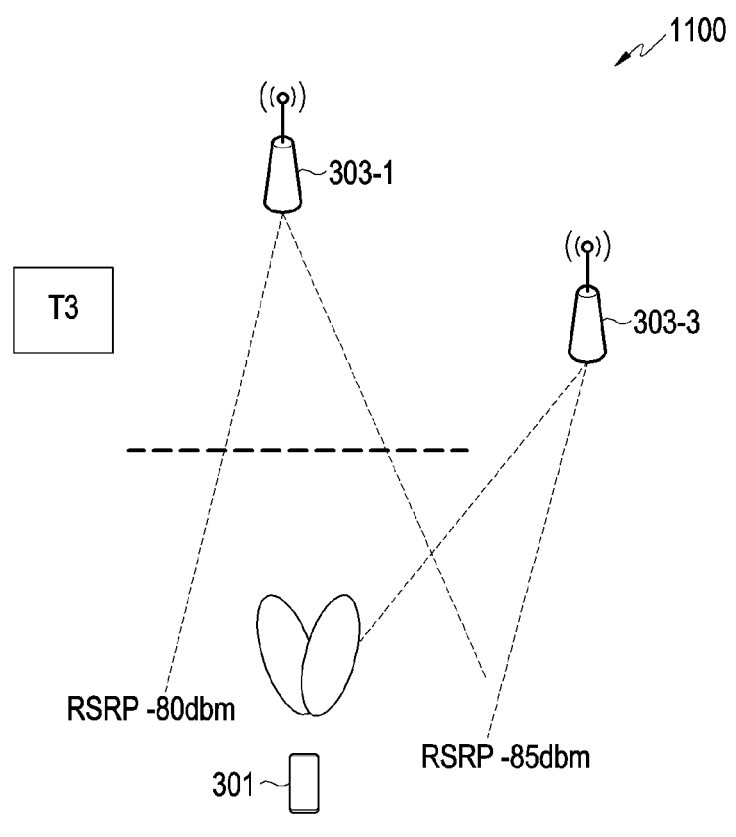
Figure 11B:
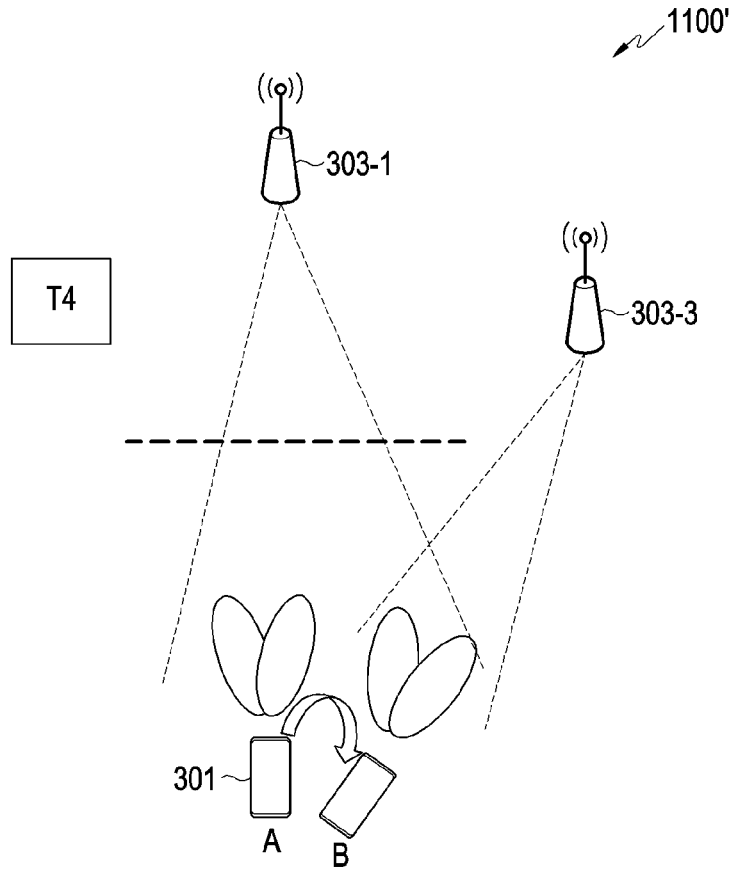
Figure 12:
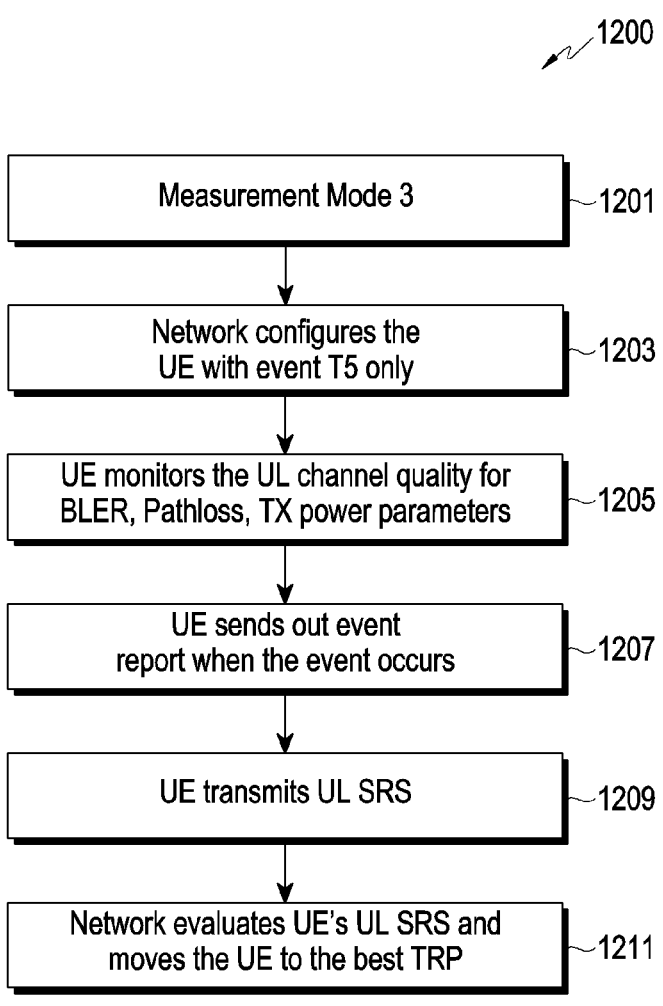
Figure 13:
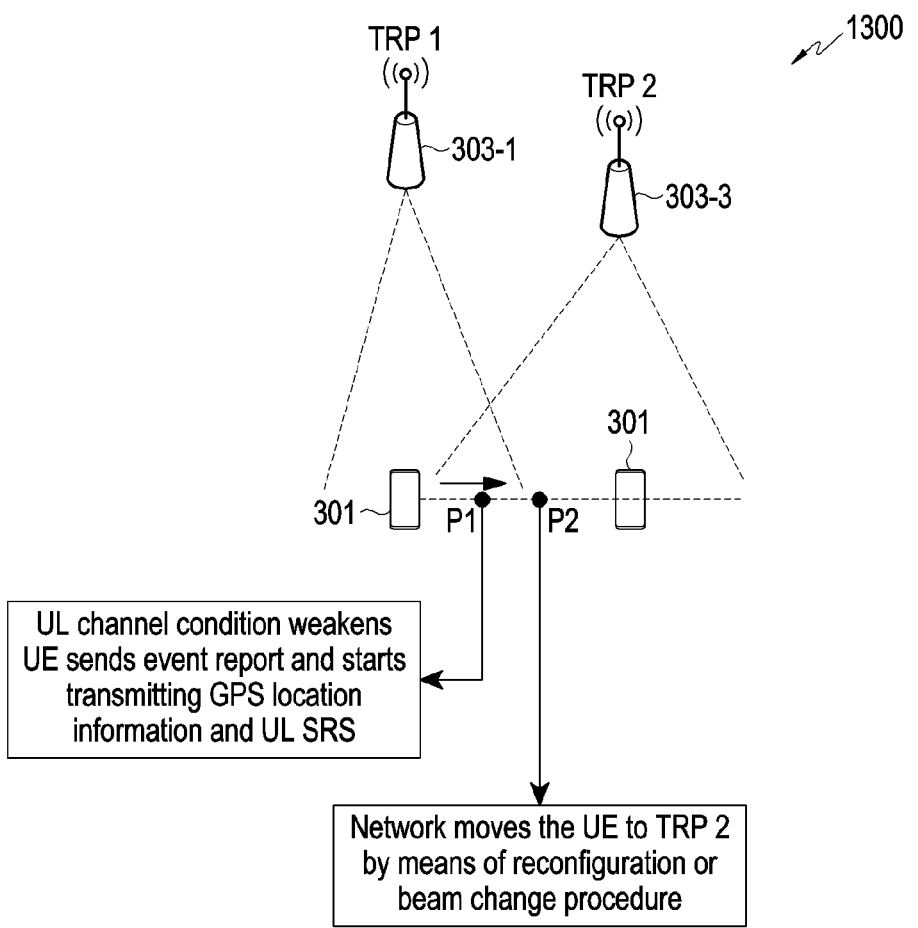
Figure 14:
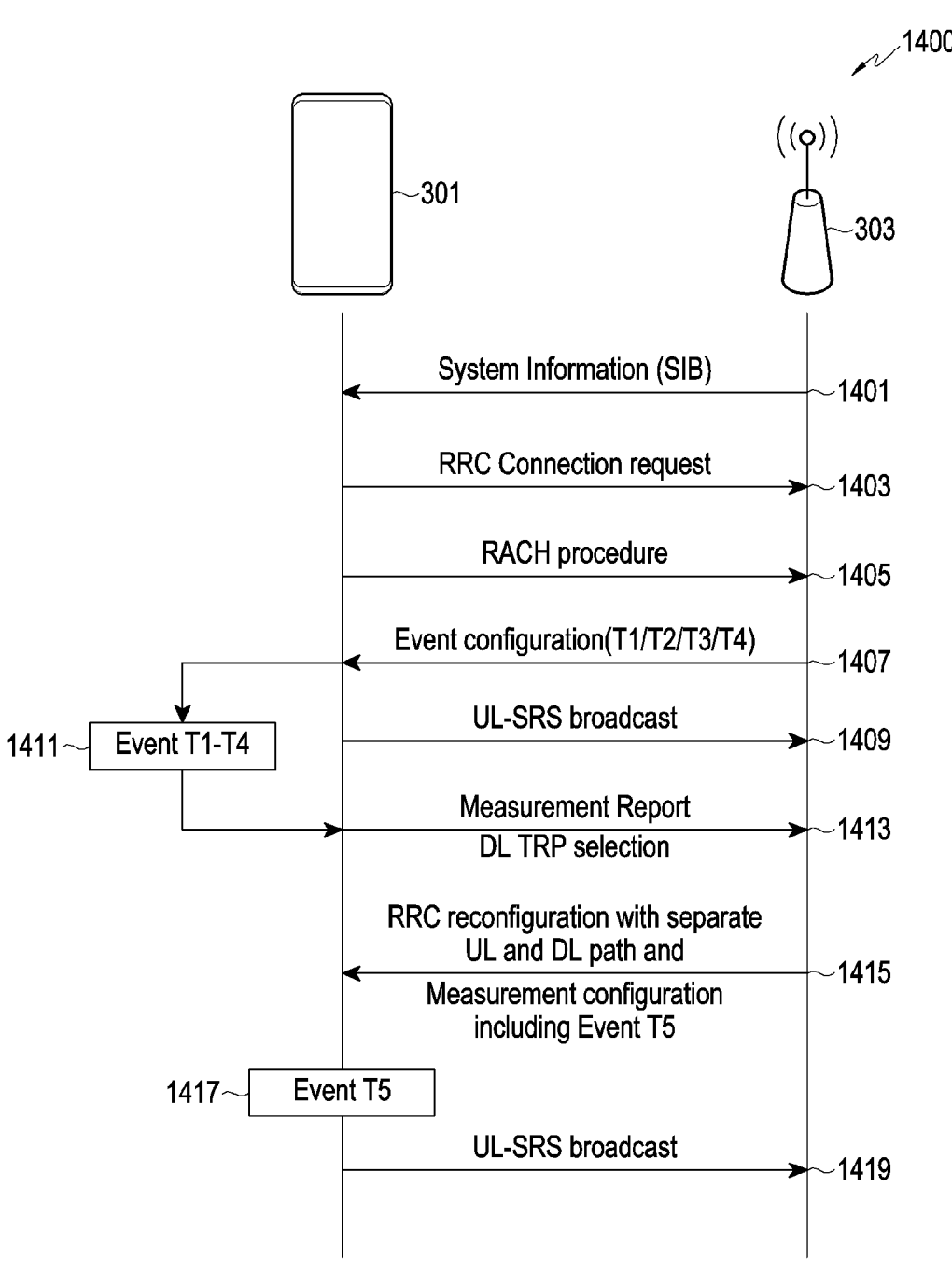
Figure 15:
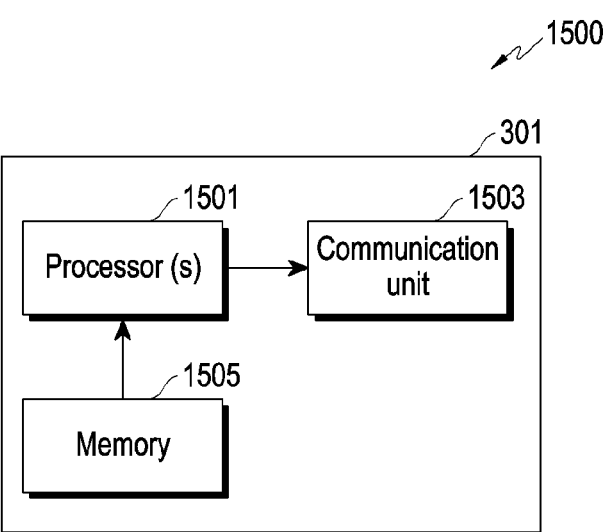

FIG. 7 is a diagram depicting one or more example reference signals for the plurality of measurement modes configurations, according to various embodiments;

FIG. 8 is a flow diagram depicting example UE actions when the network configures the UE with events T1 and T2, according to various embodiments;

FIG. 9 illustrates an example scenario in which the UE is configured with the events T1 and T2, according to various embodiments;

FIG. 10 is a flow diagram depicting example UE actions when the network configures the UE with events T3 and T4, according to various embodiments;

FIGS. 11A and 11B illustrate an example scenario in which the UE is configured with the events T3 and T4, according to various embodiments;

FIG. 12 is a flow diagram depicting example UE actions when the network configures the UE with event T5, according to various embodiments;

FIG. 13 illustrates an example scenario in which the UE is configured with the event T5, according to various embodiments;

FIG. 14 is a sequence diagram depicting an example method to configure separate Uplink (UL) and Downlink (DL) paths for the UE, according to various embodiments; and FIG. 15 is a block diagram depicting the configuration of an example UE in a wireless communication system, according to various embodiments.

Further, skilled artisans will appreciate that those elements in the drawings are illustrated for simplicity and may not have necessarily been drawn to scale. For example, the flow charts illustrate the method in terms of the steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent.

DETAILED DESCRIPTION

For the purpose of promoting an understanding of the principles of the disclosure, reference will now be made to example embodiments illustrated in the drawings and specific language will be used to describe the same. It will nevertheless be understood that no limitation of the scope of the disclosure is thereby intended, and such alterations and further modifications in the illustrated system, and further applications of the principles of the disclosure as illustrated therein are contemplated.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one example embodiment of the disclosure. Thus, appearances of the phrase "in an embodiment", "in one or more embodiments", "in another embodiment", and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process(es) or method(s). Similarly, one or more devices or sub-systems or elements or structures or components preceded by "comprises . . . a" does not, without more constraints, preclude the existence of other devices or other sub-systems or other elements or other structures or other components or additional devices or additional sub-systems or additional elements or additional structures or additional components.

The example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the embodiments herein. Also, the various example embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of modules or engines that carry out a described function or functions. These modules or engines, which may be referred to herein, for example, as units or blocks or the like, or may include blocks or units, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and/or software. The circuits may, for example, be embodied in one or more semiconductor chips, or on substrate supports such as printed circuit boards and the like. The circuits included in a block may be implemented by dedicated hardware, by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the disclosure. Likewise, the blocks of the embodiments may be physically combined into more complex blocks without departing from the disclosure.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Embodiments will be described below in detail with reference to the accompanying drawings.

In one or more embodiments, the method disclosed herein uses one or more measurement modes to provide more flexibility in measurements. In an embodiment, the UE may select to use a legacy measurement procedure which includes measurement-report-move to a new cell or may choose not to perform measurement and reporting. The UE may also select a measurement mode among one or more measurement modes, wherein the selection of the measurement mode is based on one of a mobility constraint, a power constraint, thermal constraints, or other constraints of the UE.

In one or more example embodiments, the disclosed method introduces new measurement events to provide flexibility to the UE for not performing and reporting the measurement. For example, one event among the new measurement events allows the UE to simply measure and switch to a new transmission and reception point (TRP) while another event triggers the broadcast of Uplink Sounding Reference Signal (UL SRS), which is used by a network to switch the UE's Uplink (UL)/Downlink (DL) path. At least one event among the new measurement events is introduced to track and/or report occurrence of signal disruptions or directional impact to the network or take immediate action of measuring and choosing another TRP.

In one or more example embodiments, the disclosed method allows the UE to operate in a hybrid mode of measurement such that the UE may choose different TRPs for the UL and the DL to address an issue of UL and DL imbalance.

Figure 1A:
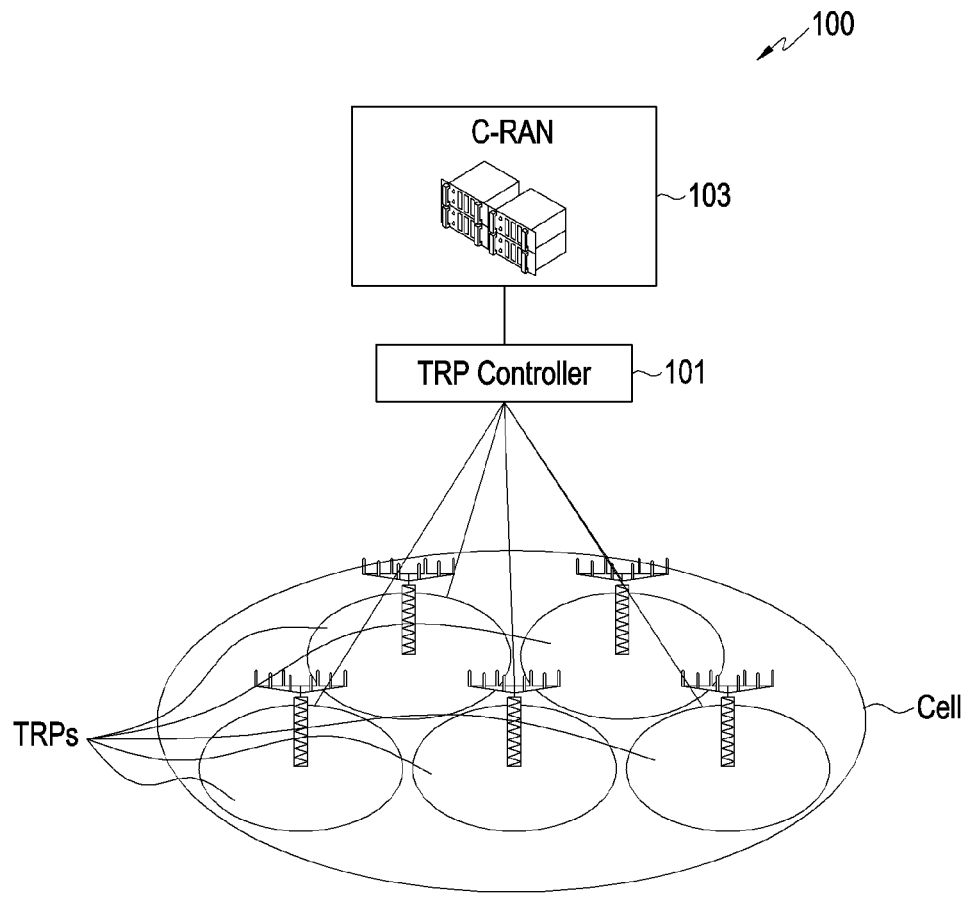
FIGS. 1A and 1B are diagrams depicting a cell free architecture of a radio network including multiple Transmission-Reception Points (TRP), in accordance with prior art.
Figure 1B:
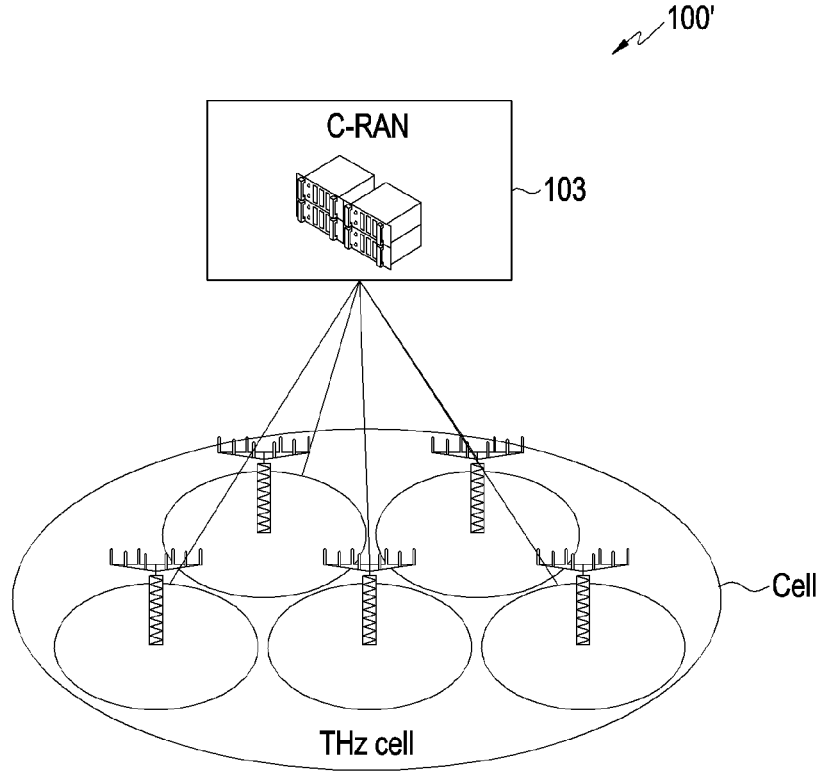
Figure 2:
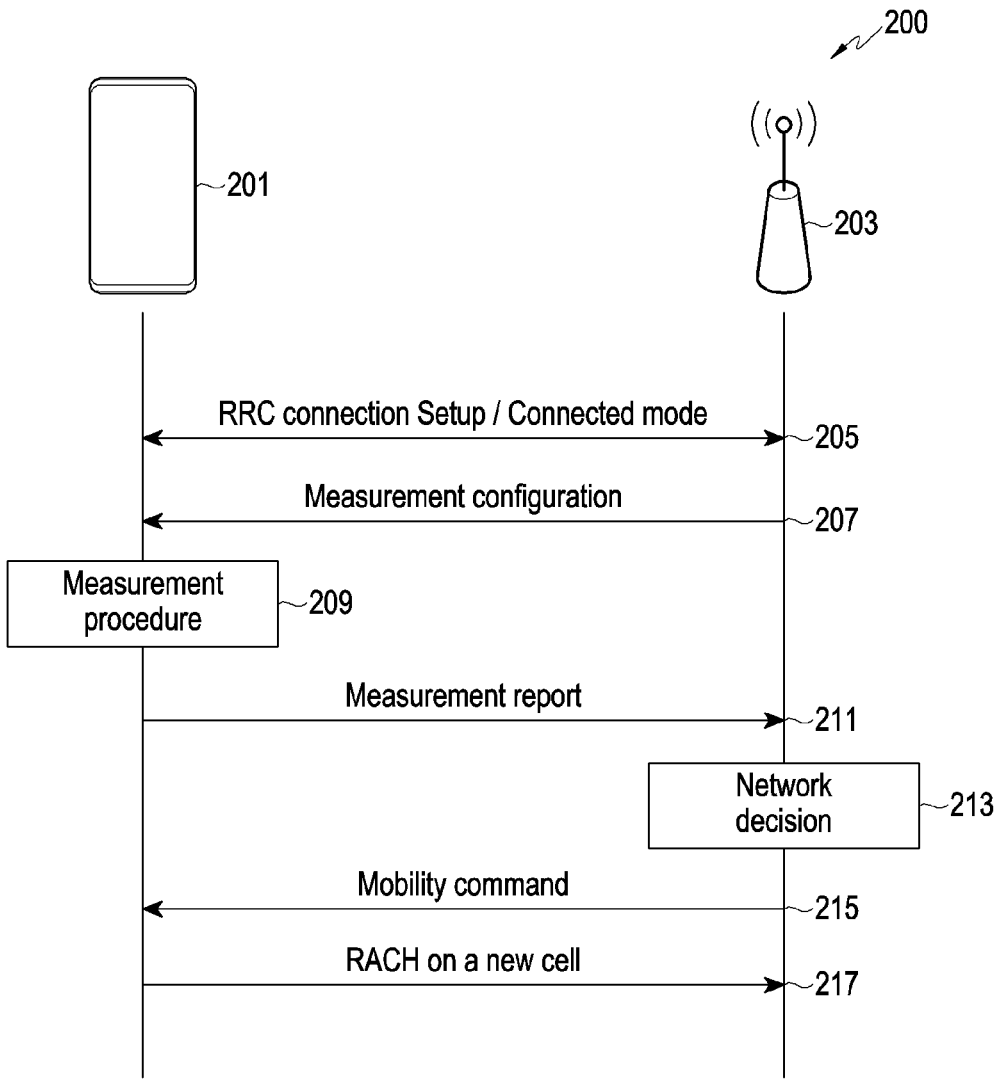
FIG. 2 is a sequence diagram depicting signaling exchange between a User Equipment (UE) and the radio network for a legacy measurement procedure, in accordance with prior art.
Figure 3A:
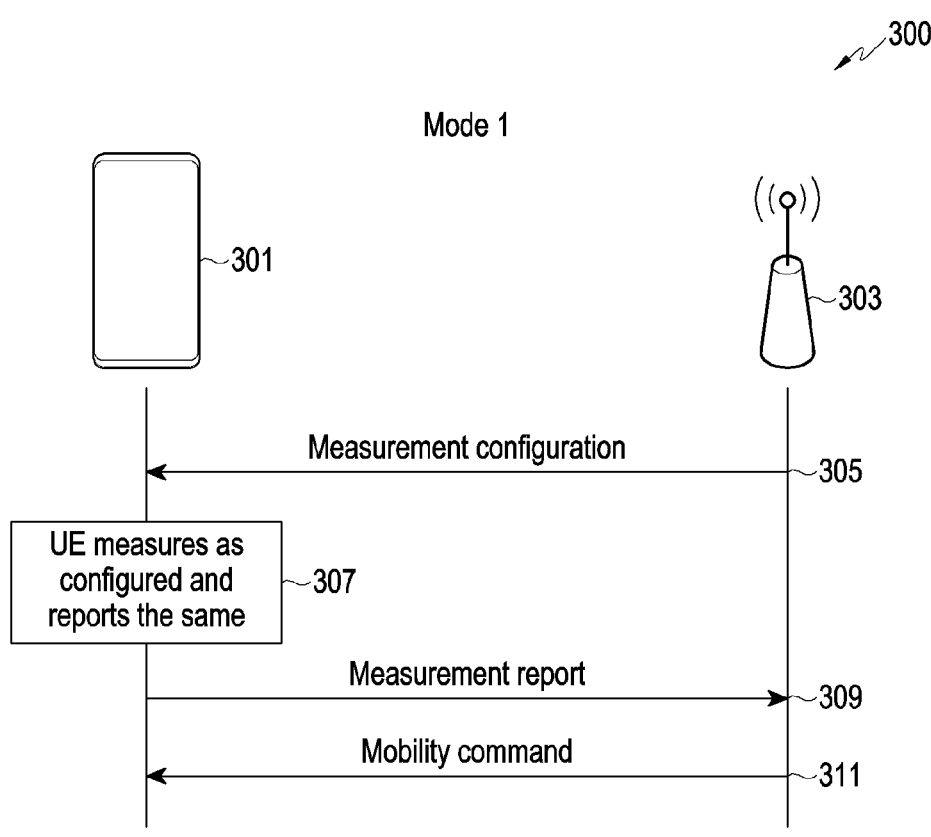
FIGS. 3A, 3B, and 3C illustrate a plurality of example measurement modes to handle UE mobility and scheduling in a multiple TRP scenario, according to various embodiments.
Figure 3B:
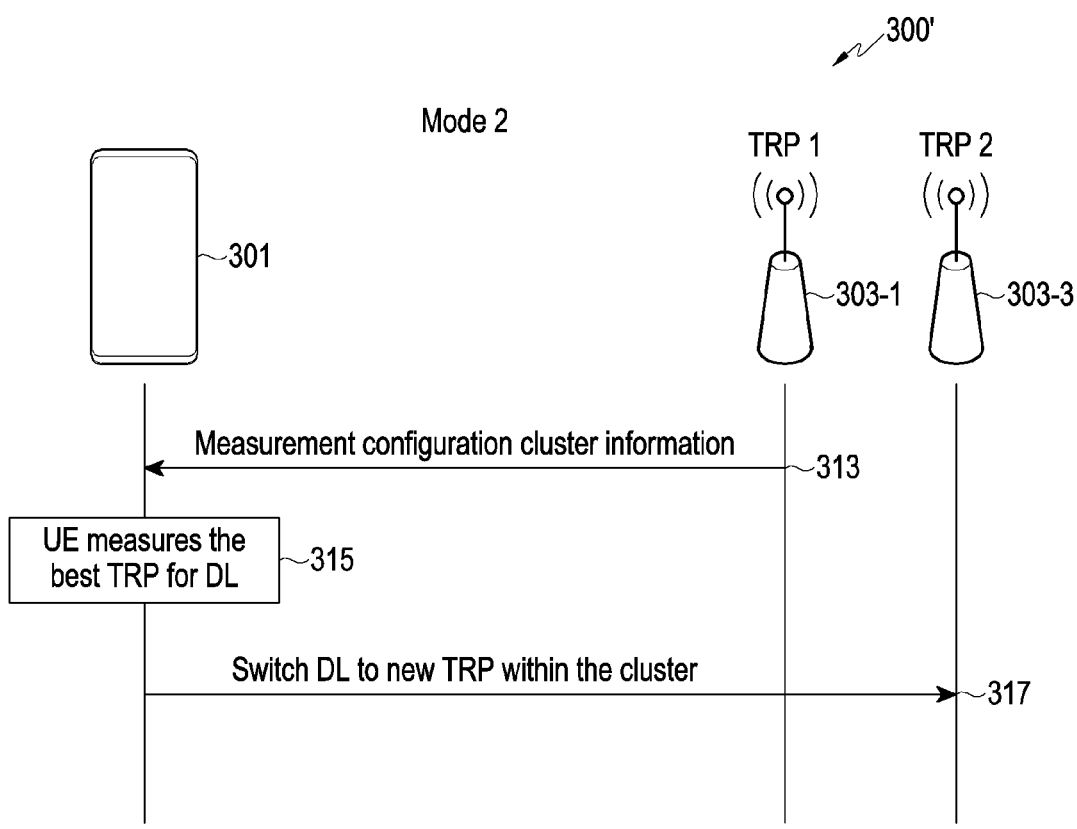
Figure 3C:
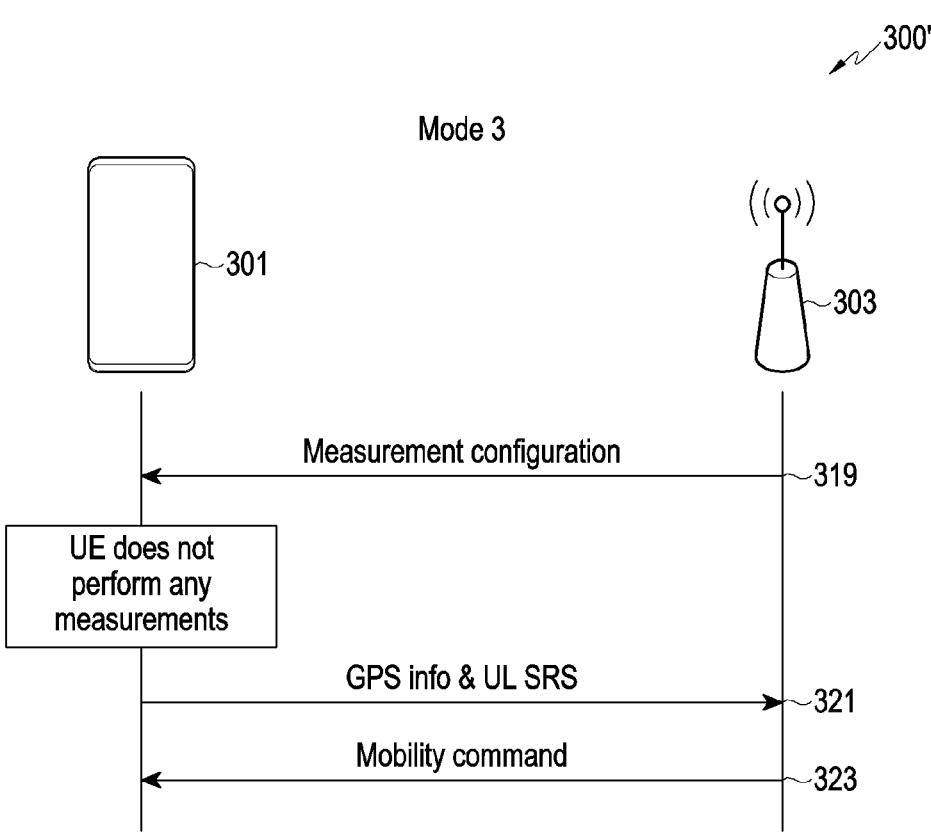

FIGS. 3A, 3B, and 3C illustrate a plurality of measurement modes 300, 300' and 300" to handle UE mobility and scheduling in a multiple TRP scenario, according to one or more example embodiments disclosed herein.

In one or more example embodiments, to handle the mobility and scheduling for multi-TRP mechanism, three measurement modes are defined. FIG. 3A illustrates mode 1 of the three measurement modes. Mode 1 is a measurement based mode or a legacy mode. The measurement based mode for handling the UE mobility and scheduling, similar to traditional LTE/NR systems, is preferred for a UE 301 with little or no mobility. In mode 1, the UE 301 may perform the measurements and send the report to a network 303.

As shown in FIG. 3A, at step 305, the UE 301 receives a measurement configuration from the network 303. The measurement configuration includes at least one measurement object and a reporting criterion. At step 307, the UE 301 performs a measurement based on the received measurement configuration. At step 309, the UE 301 transmits the measurement report of the performed measurement to the network 303 based on the reporting criterion. At step 311, in response to the transmitted measurement report, the UE 301 receives a mobility command from the network 303 to switch to a new TRP. The new TRP is selected based on the measurement report.

FIG. 3B illustrates mode 2 of the three measurement modes. Mode 2 is a measurement reporting free mode or measurement without reporting for mobility. In mode 2, the UE 301 may not send any measurement report to the network 303 to perform the mobility. Mode 2 may be used, for example, by a UE 301 having moderate mobility. Mode 2 may also be used by UEs that are operating within a TRP cluster in which all the access points are in UL sync. For such cases, the UE 301 may measure DL signals and take the decision to change the TRP independently and thereafter inform the network 303 to switch the DL path.

As shown in FIG. 3B, at step 313, the UE 301 receives a measurement configuration and cluster information associated with the multiple TRPs from a current TRP 303-1. At step 315, the UE 301 determines and selects a new TRP among the multiple TRP based on the received measurement configuration and the cluster information. At step 317, the UE 301 transmits a signal to the network 303 informing a switch of downlink (DL) path to the new TRP 303-3.

FIG. 3C illustrates mode 3 of the three measurement modes. Mode 3 is a measurement free mode. Mode 3 may be used, for example, by UEs that are fast moving or by UEs for which measurement accuracy is low. In mode 3, the UE 301 does not perform any measurements but is reliant on the network 303 to move the UE 301 to a new TRP. The UE 301 may choose the new TRP based on a GPS location, or the network 303 may perform handovers based on the GPS location reported by the UE 301 and the UE's UL SRS.

As shown in FIG. 3C, at step 319, the UE 301 receives a measurement configuration from the network 303. At step 321, the UE 301 transmits UE location information and Uplink Sounding Reference Signal (UL SRS) of the UE 301 to the network 303. At step 323, in response to the transmitted location information and the UL SRS, the UE 301 receives a mobility command from the network 303 to switch to a new TRP selected by the network 303. A selection of the new TRP is based on the UE location information and the UL SRS.

Figure 4:
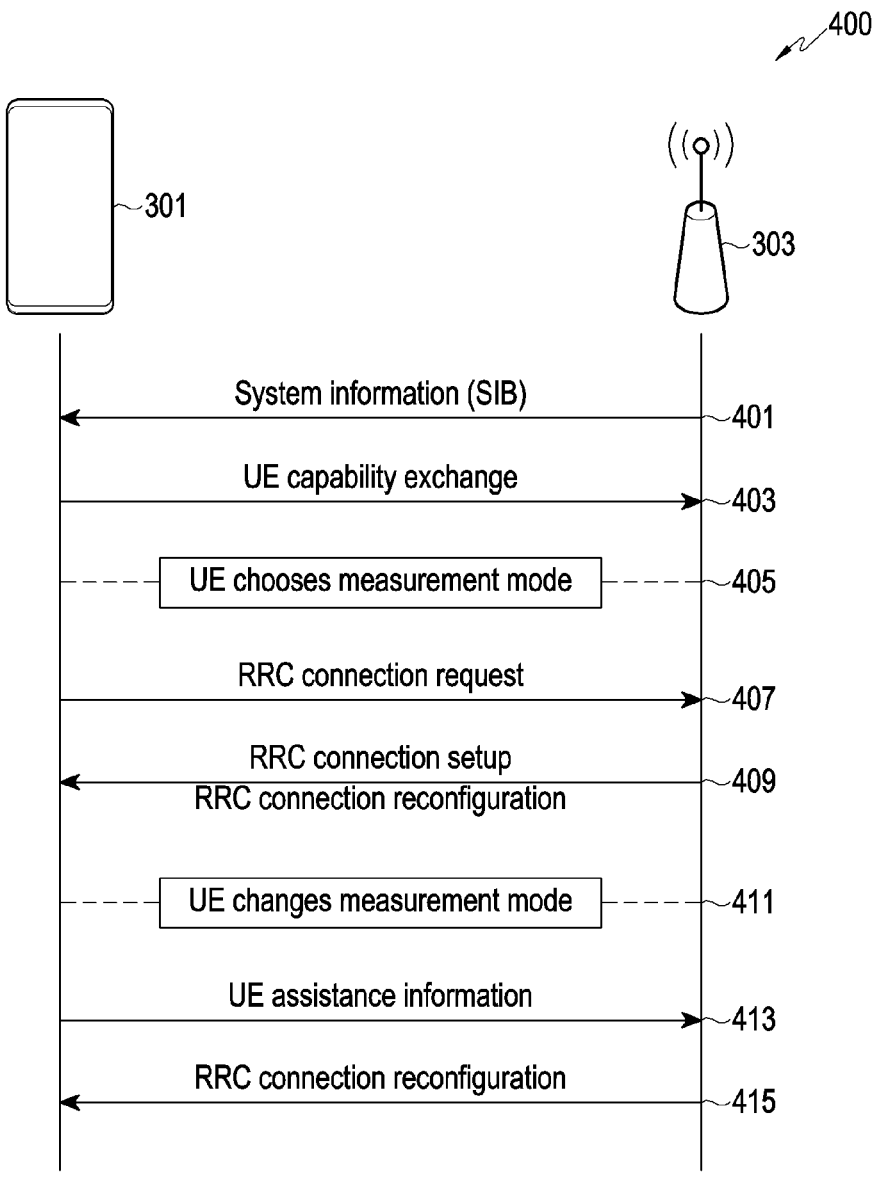
FIG. 4 is a sequence diagram depicting an example method of selecting a measurement mode at the UE in the multiple TRP scenario, according to various embodiments.

FIG. 4 is a sequence diagram depicting a method 400 of selecting a measurement mode at the UE 301 in a multiple TRP scenario, according to various embodiments.

In particular, FIG. 4 depicts a signaling exchange between the UE 301 and the network 303 to select a measurement mode. At step 401, the UE 301 receives system information (SIB) from the network 303. The SIB information indicates one or more measurement modes supported by the network 303. A format of a signaling message to signal the SIB information may be given as:

```
SystemInformationBlockTypeX
{
    measurementMode supported/not supported;
    measurementMode {model, mode2, mode3};
}
```

An example of the signaling message to signal the SIB information indicating support for mode 3 may be given as:
    Example: measurementMode supported
        measurementMode {0, 0, 1}.
At step 403, the UE 301 broadcasts the measurement mode supported by the UE 301 by means of UE capability exchange or via UE capability OTA message. The UE capability exchange indicates the UE 301 support for the measurement modes.

At step 405, the UE 301 selects the measurement mode among the three measurement modes based on one or more UE parameters. In a non-limiting example, the UE 301 may select the measurement mode based on mobility needs or other UE side intelligence.

At step 407, the UE 301 transmits to the network 303, a Radio Resource Control (RRC) connection request for the selected measurement mode. In a non-limiting example, if the UE 301 requests mode 2, the format of the signaling message to signal the RRC connection request may be given as:

```
message c1: rrcConnectionRequest:
{
    establishmentCause mo-Data,
```

-continued

```
        measurementMode mode2,
        spare '0'B
            }
        }.
```

At step 409, in response to the transmitted RRC connection request, the UE 301 receives a first RRC connection configuration from the network 303 for configuring the UE 301 with the selected measurement mode. A format of the signaling message to signal the RRC connection configuration may be given as:

```
    message c1: rrcConnectionReconfiguration:
    {
    rrc-TransactionIdentifier 1,
    criticalExtensions c1: rrcConnectionReconfiguration-r8:
        {
        measConfig
            {
            measurementMode mode2,
            }.
```

At step 411, the UE 301 changes the measurement mode while remaining in RRC connected state. The changes in the measurement mode may be based on the one or more UE parameters. In a non-limiting example, in a case in which certain applications require seamless services, the UE 301 can request to change the measurement mode to minimize the delay in the services.

At step 413, the UE 301 transmits UE assistance information to the network 303. The UE assistance information indicates a request to change the selected measurement mode when connected with the network 303 in the RRC connected state. A format of the signaling message to signal UE assistance information may be given as:

UE-Measurement-mode::=SEQUENCE {
mode1, mode2, mode3}.

At step 415, in response to the transmitted UE assistance information, the UE 301 receives a second RRC connection configuration from the network 303 for re-configuring the UE 301 with the changed measurement mode.

Figure 5:
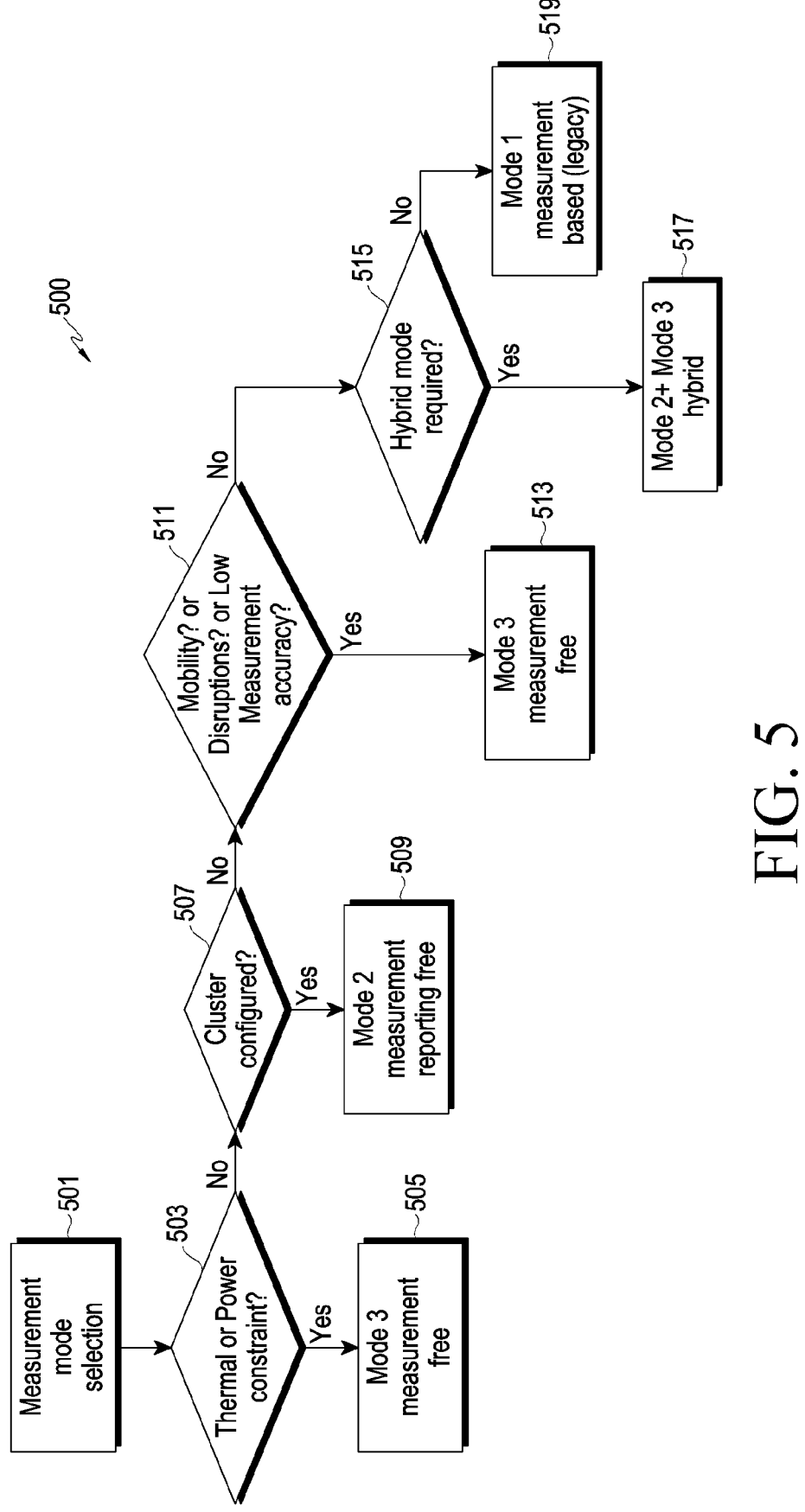
FIG. 5 is a flow diagram depicting an example selection of a measurement mode among the plurality of measurement modes, at the UE in the multiple TRP scenario, according to various embodiments.

FIG. 5 is a flow diagram 500 depicting a selection of the measurement mode, among the plurality of measurement modes, at the UE 301 in the multiple TRP scenario, according to various embodiments.

The UE 301 may select a measurement mode among the one or more measurement modes based on one or more UE parameters. The one or more UE parameters may include, but not limited to, one of mobility parameters associated with the UE 301, a delay tolerance of slices and applications that are running in the UE 301, UE power level, UE thermal level, TRP density at a given location, signal conditions at a given location, or UE cluster configuration information.

The flow of an example method for selecting a measurement mode starts at step 501. At step 501, the UE 301 receives system information (SIB) from the network 303. The SIB information indicates one or more measurement modes supported by the network 303.

At step 503, the UE 301 determines at least one of the UE power level or the UE thermal level. The UE 301 may determine, for example, whether one of the UE power level is less than a threshold power level or the UE thermal level is greater than a threshold thermal level.

At step 505, the UE 301 selects, as the measurement mode, the third measurement mode (mode 3) based on one of a determination that the UE power level is less than the threshold power level or a determination that the UE thermal level is greater than the threshold thermal level. The third measurement mode is a low power consuming mode (e.g., the least power consuming mode) as the third measurement mode allows the UE 301 to turn off measurements.

At step 507, if it is determined, at step 503, that the UE power level is greater than a threshold power level or a determination that the UE thermal level is less than a threshold thermal level, the UE 301 determines whether or not the UE 301 is configured with a cluster of the TRP. If UE 301 is configured with the cluster of the TRP which shares the same UL sync, the UE 301 can, for example, freely switch its DL TRP to one that belongs to the same cluster without the need to reperform random access procedure (RACH).

At step 509, the UE 301 selects, as the measurement mode, the second measurement mode based on the determination that one of the UE power level is greater than the threshold power level or the UE thermal level is less than the threshold thermal level, and a determination that the UE 301 is cluster configured with the cluster of the TRP. The second measurement mode is suited, for example, for conditions in which the UE 301 may not need network assistance in switching.

At step 511, if it is determined, at step 507, that the UE 301 is not configured with the cluster of the TRP, the UE 301 determines at least one of the mobility parameters associated with the UE 301, the delay tolerance of the slices and applications that are running in the UE 301 (e.g., disruptions), or the signal conditions (e.g., low measurement accuracy) at a given location.

At step 513, the UE 301 selects, as the measurement mode, the third measurement mode based on at least one of a determination that the UE 301 is not cluster configured, the UE mobility parameter indicates that the UE mobility is greater than a threshold mobility value, or a determination that low measurement accuracy is required. In a non-limiting example, if the UE 301 is highly mobile or has very low measurement accuracy, or is unable to stay on a TRP due to signal disruptions, the UE 301 may leave TRP selection to the network 303 and remain connected in the third measurement mode.

At step 515, if it is determined, at step 511 that the UE mobility is less than a threshold mobility value or the delay tolerance of the slices and applications is low or high measurement accuracy is required, the UE 301 determines whether the UE 301 is required to be moved in a hybrid mode.

In a non-limiting example, in cases in which the UE 301 requires having separate UL and DL TRP, the UE 301 may determine to operate in the hybrid mode. The UE 301 may also require separate UL and DL TRP when the UE 301 identifies that a first TRP is best for UL (e.g., the first TRP has a lower path loss, and lower TX power needed to reach) and a second TRP is better for DL (e.g., the second TRP has better DL metrics such as RSRP and SNR).

At step 517, the UE 301 selects, as the measurement mode, the hybrid mode based on the UE mobility parameter indicating that the UE mobility is less than a threshold mobility value, and a determination that the UE 301 is required to be moved in the hybrid mode.

At step 519, if each of the second measurement mode, the third measurement mode, and the hybrid mode is unavailable, the UE 301 selects the first measurement mode.

Figure 6:
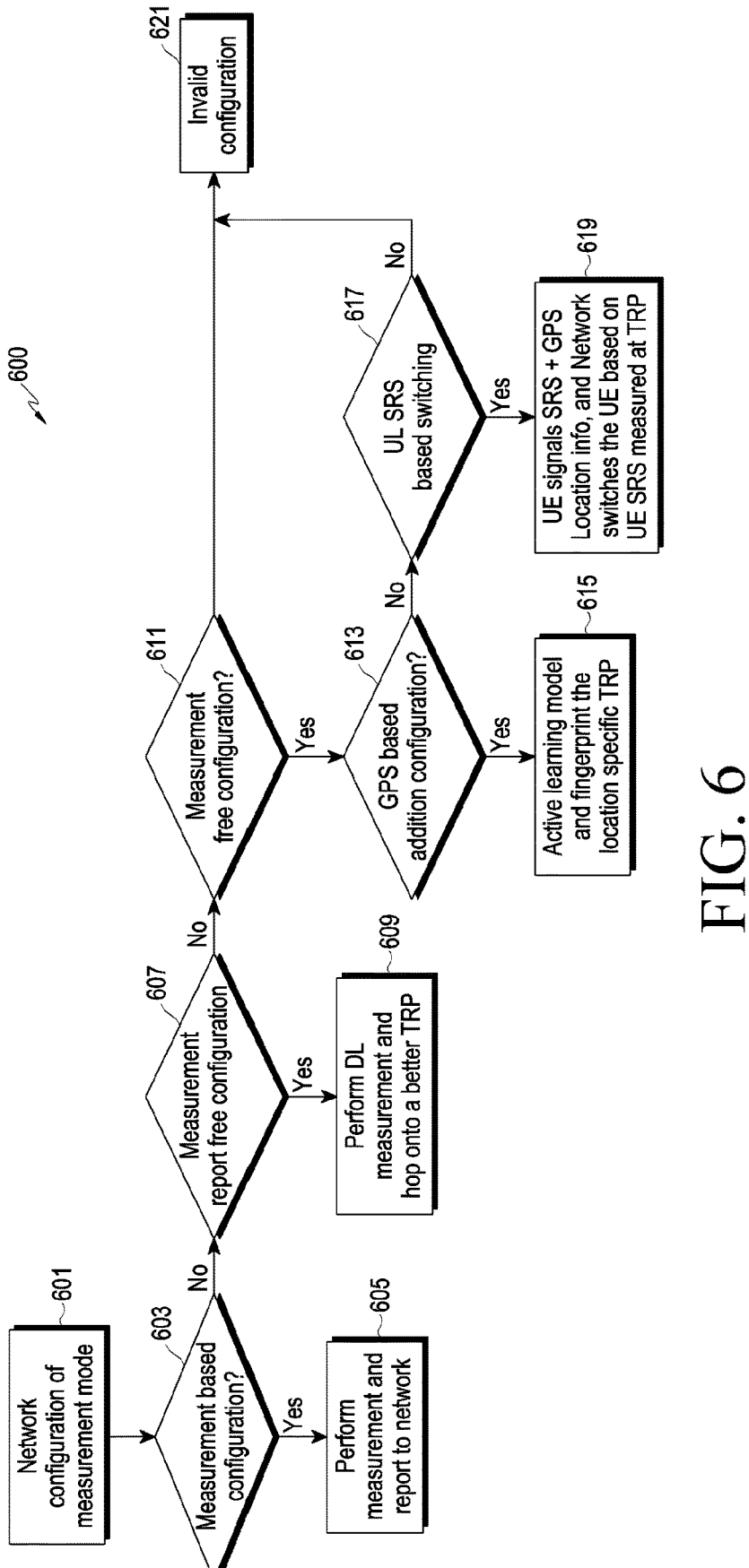
FIG. 6 is a flow diagram depicting example UE actions for each of the plurality of measurement mode configurations, according to various embodiments.

FIG. 6 is a flow diagram 600 depicting example UE actions for each of the plurality of measurement mode configurations, according to various embodiments.

At step 601, the UE 301 and the network 303 exchange the signaling to configure a measurement mode. The network 303 sends the measurement mode configuration, for example, in RRC connection configuration message 409.

At step 603, it is determined whether the measurement mode configuration is a measurement-based addition configuration. The measurement-based addition configuration is the mode 1 configuration. If it is determined that the measurement mode configuration is the measurement-based addition configuration (mode 1), the process proceeds to step 605, otherwise, the process proceeds to step 607.

At step 605, the UE 301 may perform the measurements, report the measurement to the network 303, and wait for reception of the network command from the network 303.

At step 607, the UE 301 determines whether the measurement mode configuration is a measurement report-free configuration. The measurement report-free configuration is mode 2 configuration. At step 607, if it is determined that the measurement mode configuration is the measurement report-free configuration (mode 2), the process proceeds to step 609, otherwise, the process proceeds to step 611.

At step 609, the UE 301 may perform the measurements and hop on to a better TRP which, for example, shares the same UL sync. The UE 301 may also perform DL measurements and may automatically switch to the best available TRP.

At step 611, the UE 301 determines whether the measurement mode configuration is a measurement free configuration. The measurement free configuration is mode 3 configuration. If, at step 611, it is determined that the measurement mode configuration is the measurement free configuration (mode 3), the process proceeds to step 613, otherwise, the process proceeds to step 621.

At step 613, the UE 301 determines whether a GPS-based addition is configured or not. If, at step 613, it is determined that the GPS-based addition is configured, the process proceeds to step 615, otherwise, the process proceeds to step 617.

At step 615, the UE 301 uses the active learning models and fingerprints the location of a specific TRP. The UE 301 may also use the database for future reference to switch to the specific TRP when the UE 301 is present at the location coordinates of the specific TRP. Alternatively, the UE 301 may report the UE's GPS location to the network 303 and wait for the network 303 to switch the UE 301 to a better TRP.

At step 617, the UE 301 determines if a UL SRS based switching is being performed or not. If, at step 617, it is determined that the UL SRS based switching is being performed, the process proceeds to step 619, otherwise, the process proceeds to step 621.

At step 619, the UE 301 may signal the UL SRS signal and the GPS location of the UE to the network 303 and wait for the network 303 to handover the UE 301 to the better TRP. The network 303 may select the better TRP based on, for example, the UL SRS signal.

At step 621, if the measurement configuration is not determined in any of the above-mentioned steps 601 through 619, it is determined that the configuration is invalid.

FIG. 7 is a diagram 700 depicting the one or more example reference signals for the plurality of measurement modes configurations, according to various embodiments.

Reference signals are, for example, predefined signals occupying specific resource elements within the downlink time-frequency grid. The one or more reference signals are exchanged between the UE 301 and the network 303 for different purposes. The UE 301 may report the strength of the one or more reference signals to the network 303 and enable the network 303 to learn the UE's channel quality. DL reference signals are signals for the UE 301 to measure and report while UL reference signals are signals transmitted by the UE 301 to the network 303 for estimating the quality of the UE's UL path.

The one or more reference signals in determining the UE action on measurement mode include a TRP synchronization signal (TSS) 701, a TRP reference signal (TRP-RS) 703, and the TRP Uplink Sounding reference signal (UL SRS) 705.

The TSS is used for downlink synchronization and to estimate cell power. The TRP-RS is used for channel state estimation like in the 5G wireless communication system. The TRP-RS signal may be periodic, aperiodic, or semi-persistent. The TRP-RS signal is used for RSRP measurement during the mobility and beam change procedure. The UL SRS is used for UL channel estimation like in the 5G wireless communication system. The network 303 provides UE specific configuration for the transmission of SRS.

Further, measurement event configuration for the 6G wireless communication system will be described according to various embodiments.

In any measurement configuration, the network 303 needs to allow the UE 301 to report serving cell signal quality and neighbor cell signal quality, and to trigger the handover with a single measurement. However, in practice, triggering the handover with a single measurement may create overload conditions due to unnecessary measurement reporting and frequent handovers.

To avoid such a situation, 3GPP specifications have introduced a predefined set of measurement report mechanisms to be performed by UE 301. Each of these predefined measurement report mechanisms is called an "Event". The type of "event" that the UE 301 has to report is specified by the RRC signaling message sent by the network 303.

The 3GPP specifications have introduced the following events as shown in Table 1:

TABLE 1

| Event Type | Description |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event A6 | Neighbours become offset better than S Cell (This event is introduced in Release 10 for CA) |
| Event B1 | Inter RAT neighbour becomes better than threshold |
| Event B2 | Serving becomes worse than threshold1 and inter RAT neighbour becomes better than threshold2 |

Events A1-A6 are the same as RAT events and B1-B2 are the same as inter-RAT events. The UE 301 keeps on measuring serving cell and neighbor cell parameters and validates the events with the threshold or offset defined in the report configuration. The report quantity/trigger for the event can be Reference Signal Received Power (RSRP), Reference Signal Received Quality (RSRQ), or Signal-to-Noise Ratio (SINR). If the condition is met, the event report must be sent to the network 303.

Further, in the 6G wireless communication system, a few additional events are required so that the UE 301 can support all the measurement modes. Also, to address a few other shortcomings of the traditional measurement system such as not accounting for disruptions or directional impact, new events are described. Further, the transmission of UL SRS for measurement free mode can also be activated using an event as SRS transmission to reduce the operational cost.

Examples of such additional events are shown in Table 2:

TABLE 2

| Event | Description |
|---|---|
| Event T1 | TRP-RS resource becomes better than threshold |
| Event T2 | TRP-RS resource becomes offset better than reference resource |
| Event T3 | Disruptions to the signal quality become worse than threshold |
| Event T4 | Signal quality becomes worse than threshold due to a change in the direction of the UE |
| Event T5 | UL statistic becomes worse than threshold, broadcast SRS |

FIG. 8 is a flow diagram 800 depicting example UE actions when the network 303 configures the UE 301 with events T1 and T2, according to various embodiments.

Events T1 and T2 are used to inform the network 303 that the UE 301 has switched to a new TRP in mode 2 of measurements. At step 801, the UE 301 is configured in mode 2 of the measurement. At step 803, the network 303 transmits the measurement configuration to the UE 301. The measurement configuration includes the cell cluster information of the cluster of TRP.

At step 805, the network 303 configures the UE 301 with event T1 and event T2. The network 303 transmits the information related to triggering the configured event T1 and T2. The UE 301 receives information related to the triggering of events T1 and T2 from the network 303. The event T1 is triggered when a new TRP resource becomes better than a first threshold, and the event T2 is triggered when the new TRP resource becomes offset better than a configured TRP resource.

An example format of a signaling message to signal Event T1 and Event T2 may be given as:

Event T1:
SNR_neighbour>SNR_threshold
  Switch to neighbour TRP;
Event T2:
SNR_neighbour>SNR_current+offset
  Switch to neighbour TRP,
where, SNR_neighbour is the signal-to-noise ratio of the
  strongest neighbor found, and SNR_Current is the
  signal-to-noise ratio of the current serving cell.

At step 807, the UE 301 uses TRP-RS 703 for measurement and then switches to the best TRP.

At step 809, the UE 301 transmits the measurement report to the network 303 to report the triggering of the event T1 and/or the event T2 to the network 303. The UE 301 may transmit, to the network 303, a signal informing the switch of the DL path to the new TRP upon reporting the triggered event T1 and/or the event T2 to the network 303. An example format of the signaling message to signal measurement report in case of event T1 and event T2 may be given as:

```
value UL-DCCH-Message :: =
{
    message C1 : measurementReport :
```

-continued

```
{
criticalExtensions c1 : measurementReport-r8:
{
SelectedTRPID: TRP 2;
measResults
{
measId 8,
measResultPCell
{
rsrpResult 38,
rerqResult 15
}.
```

FIG. 9 illustrates an example scenario 900 in which the UE 301 is configured with the events T1 and T2, according to various embodiments. In FIG. 9, the UE 301 is configured in the mode 2 of the measurement. Further, the UE 301 is configured with event T1 and event T2 by the network 303.

Initially, the UE 301 is connected with the TRP-1 303-1. As the UE 301 moves from the TRP-1 303-1 to TRP-2 303-3, it first reaches point P1. At the point P1, the signal-to-noise ratio of the TRP-2 303-3 becomes greater than a first threshold SNR value or the RSRP of the TRP-2 303-3 becomes greater than a first threshold RSRP value. The UE 301 then reports the event T1 to the network 303.

As the UE 301 moves further into TRP-2 303-3, it first reaches a point P2. At point P2, the signal-to-noise ratio of the TRP-2 303-3 becomes offset better than the first threshold SNR value. The UE 301 then reports the event T2 to the network 303. At point P3, the UE 301 switches to TRP2 and informs the network 303.

FIG. 10 is a flow diagram 1000 depicting example UE actions when the network 303 configures the UE 301 with events T3 and T4, according to various embodiments.

Event T3 is to allow the network 303 to monitor signal disruptions due to non (line of sight) LoS. Event T4 is to allow the UE 301 to report a degradation in the RSRP due to a change in orientation/direction of the UE 301. At step 1001, the UE 301 is configured in one of mode 1 or mode 2 of the measurement. At step 803, the network 303 transmits the measurement configuration to the UE 301.

At step 1003, the network 303 configures the UE 301 with events T3 and/or T4. The network 303 transmits the information related to triggering the configured events T3 and/or T4 to the UE 301. The UE 301 receives information related to the triggering of events T3 and/or T4 from the network 303. The event T3 is triggered when disruptions to the signal quality become worse than a second threshold (e.g. RSRP threshold, SNR threshold, RLF threshold, etc.), and event T4 is triggered when signal quality becomes worse than a third threshold due to a change in a direction of the UE 301.

An example format of the signaling message to signal Event T3 may be given as:

```
EventId Event T3
{
    threshold - disruption-RSRP: value;
    threshold - disruption-SNR: value;
    threshold - disruption-RLF: value;
}
```

Further, an example format of the signaling message to signal Event T4 may be given as:

```
EventId Event T4
{
    threshold - direction: value;
    threshold - orientation: value;
}.
```

At step 1005, in measurement mode 1, the UE 301 monitors and reports the events T3 and/or event T4 to the network 303.

At step 1007, in the measurement mode 2, the UE 301 selects the new TRP and transmits the signal informing the switch of the DL path to the new TRP upon reporting one of the event T3 or event T4.

At step 1009, in measurement mode 1, the network 303 moves the UE 301 to the next best TRP upon reporting one of the events T3 or T4. The next best TRP may be understood as the best TRP regarding the measurement other than the current TRP.

FIGS. 11A and 11B illustrate example scenarios 1100, 1100' in which the UE 301 is configured with the events T3 and/or T4, according to various embodiments. In FIGS. 11A and 11B, the UE 301 is configured in one of the measurements mode 1 or mode 2. Further, the UE 301 is configured with event T3 and/or event T4 by the network 303. Event T3 is triggered when disruptions to the signal quality become worse than the second threshold. Event T4 is triggered when signal quality becomes worse than the third threshold due to a change in a direction of the UE 301.

In FIG. 11A, the UE 301 is connected with the TRP-1 303-1. As shown in FIG. 11A, the RSRP of TRP-1 303-1 drops due to an object blocking the LoS of the TRP-1 303-1. At this point, when the RSRP of TRP-1 303-1 drops below the RSRP of TRP-2 303-3, an event T3 may be triggered. The UE 301 reports the triggering of the event T3 to the network 303 and moves into the TRP-2 303-3.

In FIG. 11B, the UE 301 is connected with the TRP-1 303-1. When the orientation of the UE 301 changes from position A to B, the event T4 triggers. The UE 301 reports the triggering of the event T4 to the network 303 and moves into the TRP-2 303-3.

FIG. 12 is a flow diagram 1200 depicting example UE actions when the network 303 configures the UE 301 with event T5, according to various embodiments.

Event T5 allows the UE 301 to broadcast SRS when UL metrics become weak beyond a fourth threshold. At step 1201, the UE 301 is configured in the measurement mode 3. At step 1203, the network 303 transmits the measurement configuration to the UE 301. At step 1203, the network 303 configures the UE 301 with event T5 only. The network 303 transmits the information related to the triggering of the configured event T5 to the UE 301.

An example format of the signaling message to signal Event T5 may be given as:

```
EventId Event T5
{
    threshold - UL BLER: value;
    threshold - TX power: value;
    threshold - Pathloss: value;
}.
```

At step 1205, the UE 301 monitors the UL channel quality for Block Error Rate (BLER), path loss, and TX power parameters.

At step 1207, UE 301 sends out an event report when the event T5 occurs. The UE 301 may transmit the measurement report to the network 303. An example format of the signaling message to signal measurement report in case of event T5 may be given as:

```
value UL-DCCH-Message :: =
{
    message C1 : measurementReport :
    {
    criticalExtensions c1 : measurementReport-r8:
    {
    Event T5: UL parameter which triggered it
    }.
```

At step 1209, the UE 301 transmits UL SRS of the UE 301. At step 1211, the network 303 evaluates UE's UL SRS and moves the UE 301 to the best TRP.

FIG. 13 illustrates an example scenario 1300 in which the UE 301 is configured with the event T5, according to various embodiments. In FIG. 13, the UE 301 is configured in the measurement mode 3. Further, the UE 301 is configured with event T5 by the network 303. Event T5 is triggered when an uplink channel quality of the UE 301 becomes less than a threshold channel quality.

Initially, the UE 301 is connected with the TRP-1 303-1. As the UE 301 moves from the TRP-1 303-1 to TRP-2 303-3, the UE 301 first reaches point P1. At point P1, the uplink channel quality of the UE 301 becomes less than the threshold channel quality. At point P1, the UE 301 starts transmitting the GPS location information and the UL SRS to the network 303.

At point P2, the network 303 moves the UE 301 to TRP-2 303-3 by means of reconfiguration or beam change procedure.

FIG. 14 is a sequence diagram depicting a method 1400 to configure separate the UL and DL paths for the UE 301, according to various embodiments.

In a multi-TRP system, the best DL TRP is not necessarily the best for UL. Due to the LoS nature of THz systems and the effect of multi-path, the network 303 may connect better to the UE 301 through a different TRP. Further, the UE 301 may use the TRP-1 303-1 as UL metrics are better suited for the UL and may use the TRP-2 303-3 which has better DL metrics than the TRP-1 303-1.

For determining the best UL and DL channel of the UE, the network 303 may use the hybrid mode in which both T1, T2, and T5 are configured at the same time. The hybrid mode may allow the UE 301 to switch to the right TRP for DL based on T1/T2/T3/T4 and at the same time report T5 as well so that the network 303 provides the new UL TRP.

The method 1400 starts at step 1401, and at step 1401 the UE 301 receives system information (SIB) from the network 303. The SIB carries an SRS broadcast configuration which tells the UE 301 when SRS can be broadcasted.

At step 1403, the UE 301 transmits the RRC connection request to the network 303. The UE 301 may indicate mode 2 and mode 3 as the preference in the RRC connection request. On receiving the RRC connection request, the network 303 identifies that the UE 301 is operating in the hybrid mode.

At step 1405, the UE 301 starts a random access procedure (RACH). At step 1407, the network 303 configures the UE 301 with events T 1, T2, T3, and T4. At the same time, at step 1409, the UE 301 broadcasts the UL SRS signal. The UE 301 broadcasts UL SRS to all the TRP in that cluster so that a TRP controller can estimate which is the best UL path for the UE 301.

At step 1411, the UE 301 monitors the events T1 to T4. The UE 301 selects the best DL TRP using the triggering of events T1 to T4.

At step 1413, the UE 301 may send the measurement report to the network 303. The UE 301 may send a signal to network 303 to switch to the best DL TRP. Once the TRP controller has identified the best TRP for UL for the UE, the UE 301 may configure the DL and UL paths accordingly in RRC reconfiguration.

At step 1415, the network 303 sends the RRC reconfiguration message with a separate UL and DL path and the network 303 configures the UE 301 with event T5.

At step 1417, the UE 301 monitors the event T5. If the quality of the UE's UL path is being degraded, the UE 301 may immediately broadcast UL SRS to all the TRPs in the cluster and the TRP controller may again estimate the best UL path for UE 301. At step 1419, the UE 301 broadcasts the UL SRS signal to all the TRPs upon triggering the event T5.

FIG. 15 is a block diagram 1500 depicting a configuration of an example UE 301 in the wireless communication system, according to various embodiments. The configuration of FIG. 15 may be understood as a part of the configuration of the UE 301. Hereinafter, it is understood that terms including "unit" or "module" at the end may, for example, refer to a unit for processing at least one function or operation and may be implemented in hardware, software, or a combination of hardware and software.

Referring to FIG. 15, the UE 301 may include at least one processor 1501, a communication unit 1503 (e.g., communicator or communication interface or a communication circuit), and a storage unit (e.g., memory 1505). By way of example, the UE 301 may be a user device, such as a cellular phone or other device that communicates over a plurality of cellular networks (such as a 3G, 4G, a 5G or pre-5G, 6G network or any future wireless communication network). The communication unit 1503 may perform functions for transmitting and receiving signals via a wireless channel.

As an example, the processor 1501 may be a single processing unit or a number of units, all of which may include multiple computing units. The processor 1501 may be implemented as one or more microprocessors, microcomputers, microcontrollers, digital signal processors, central processing units, state machines, logic circuitries, and/or any devices that manipulate signals based on operational instructions. Among other capabilities, the processor 1501 is configured to fetch and execute computer-readable instructions and data stored in the memory. The processor 1501 may include one or a plurality of processors. At this time, one or a plurality of processors 1501 may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors 1501 may control the processing of the input data in accordance with a predefined operating rule or artificial intelligence (AI) model stored in the non-volatile memory and the volatile memory, i.e., the memory 1505. The predefined operating rule or artificial intelligence model is provided through training or learning. The processor 1501 may control operations of other elements of the UE 301 and overall operations of the UE 301. Thus, the operations of the UE 301 may be understood as being substantially performed by the processor 1501.

The memory 1505 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The method disclosed herein provides various technical advantages and benefits including, for example without limitation, triggering a measurement and moving to a stable beam if the current beam has a lot of disruptions even though the current beam is strong.

The disclosed methods further provide flexibility in terms of measurement reporting. In a case in which the UE mobility is high, the disclosed method, for example without limitation, facilitates the handover for the UE without requiring the UE to perform measurement and reporting.

In mm-wave and 6G Terahertz systems, the UE is very sensitive to directions. The disclosed methods, for example without limitation, help in triggering the re-evaluation of the UE measurement metrics and reporting to the network if a change in any of the directions associated with the UE is detected.

In addition, the disclosed methods advantageously provide, for example without limitation, flexibility to have separate UL and DL TRPs so that overall performance is more balanced. Therefore, the disclosed methods help, for example without limitation, in overcoming the problem of UL and DL channel imbalance.

Furthermore, the disclosed methods provide, for example without limitation, an innovative framework for performing measurements in a multi-TRP system and thus are capable of solving the problems that are foreseeable within a multi-TRP system.

Unless otherwise defined, all technical and scientific terms used herein have the same meaning as commonly understood by one ordinary skilled in the art to which this invention belongs. The system, methods, and examples provided herein are illustrative only and not intended to be limiting.

While specific language has been used to describe the present subject matter, any limitations arising on account thereto, are not intended. As would be apparent to a person in the art, various working modifications may be made to the method to implement the concepts disclosed herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for selecting a measurement mode by a user equipment (UE) in a communication system including multiple transmission and reception points (TRPs), the method comprising:

receiving, from a network entity which controls the multiple TRPs, system information indicating one or more measurement modes supported by the network entity;

selecting a measurement mode among the one or more measurement modes based on one or more UE parameters;

transmitting, to the network entity, a radio resource control (RRC) connection request for the selected measurement mode; and receiving, from the network entity in response to the transmitted RRC connection request, a first RRC connection configuration for configuring the UE with the selected measurement mode.

2. The method of claim 1, further comprising:

transmitting, to the network entity, UE assistance information indicating a request to change the selected measurement mode while the UE is in an RRC connected state; and receiving, from the network entity in response to the transmitted UE assistance information, a second RRC connection configuration for re-configuring the UE with the changed measurement mode.

3. The method of claim 1, wherein the one or more UE parameters includes at least one of a mobility parameter associated with the UE, a rotation parameter associated with the UE, a power level associated with the UE, a thermal level associated with the UE, or a cluster configuration associated with the UE, wherein information corresponding to the UE cluster configuration indicates whether or not the UE is configured with a TRP cluster.

4. The method of claim 1, wherein the one or more measurement modes include a first measurement mode, a second measurement mode, a third measurement mode, or a hybrid mode.

5. The method of claim 4, wherein selecting the measurement mode among the one or more measurement modes comprises:

selecting, as the measurement mode, the third measurement mode based on one of:

a determination that a UE power level is less than a threshold power level;

a determination that a UE thermal level is greater than a threshold thermal level; or a determination that the UE is not configured with a TRP cluster and UE mobility is greater than a threshold mobility value.

6. The method of claim 5, wherein, in the third measurement mode, the method further comprises:

receiving, from the network entity, a measurement configuration;

transmitting, to the network entity, UE location information and an Uplink Sounding Reference Signal (UL SRS) of the UE; and receiving, from the network entity in response to the transmitted UE location information and the UL SRS, a mobility command to switch to a new TRP among the multiple TRPs selected by the network entity, wherein a selection of the new TRP is based on the UE location information and the UL SRS.

7. The method of claim 6, wherein, in the third measurement mode, the method further comprises:

receiving, from the network entity, information related to triggering of an event associated with reporting criteria, wherein the information related to the triggering of the event include information associated with triggering of a first event, and the first event is triggered when an uplink channel quality of the UE becomes less than a threshold channel quality;

reporting the triggered first event to the network entity when the uplink channel quality becomes less than the threshold channel quality; and transmitting, to the network entity, the UE location information and the UL SRS upon reporting the triggered first event to the network entity.

8. The method of claim 4, wherein, selecting the measurement mode among the one or more measurement modes comprises:

selecting, as the measurement mode, the second measurement mode based on:

a determination that one of a UE power level is greater than a threshold power level or a UE thermal level is less than a threshold thermal level, and a determination that the UE is configured with a TRP cluster.

9. The method of claim 8, wherein, in the second measurement mode, the method further comprises:

receiving, from the network entity, a measurement configuration and cluster information associated with the multiple TRPs;

determining, and selecting a new TRP among the multiple TRPs based on the received measurement configuration and the cluster information; and transmitting, to the network entity, a signal informing a switch of downlink (DL) path to the new TRP.

10. The method of claim 9, wherein, in the second measurement mode, the method further comprises:

receiving, from the network entity, information related to triggering of an event associated with reporting criteria, wherein the information related to triggering of the event includes information associated with triggering of a first event and a second event, the first event is triggered when a TRP resource of a new TRP among the multiple TRPs becomes better than a threshold, and the second event is triggered when the TRP resource of the new TRP becomes offset better than a configured TRP resource, reporting the triggered first event and the triggered second event to the network entity, and transmitting, to the network entity, a signal informing the switch of downlink (DL) path to the new TRP upon reporting the triggered first event and the triggered second event to the network entity.

11. The method of claim 4, wherein selecting the measurement mode among the one or more measurement modes comprises:

selecting, as the measurement mode, the hybrid mode based on:

a determination that one of a UE power level is greater than a threshold power level or a UE thermal level is less than a threshold thermal level, a determination that UE mobility is less than a threshold mobility value, and a determination that the UE is required to be moved in the hybrid mode.

12. The method of claim 11, wherein the UE is determined to be required to be moved in the hybrid mode based on the UE determining that a first TRP among the multiple TRPs is better suited for Downlink (DL) and a second TRP among the multiple TRPs different from the first TRP is better suited for Uplink (UL).

13. The method of claim 4, wherein selecting the measurement mode among the one or more measurement modes comprises:

selecting, as the measurement mode, the first measurement mode based on an unavailability of other measurement modes except the first measurement mode among the one or more measurement modes.

14. The method of claim 13, wherein, in the first measurement mode, the method further comprises:

receiving, from the network entity, a measurement configuration;

performing a measurement based on the received measurement configuration;

transmitting, to the network entity, a measurement report of the performed measurement; and receiving, from the network entity in response to the transmitted measurement report, a mobility command to switch to a new TRP among the multiple TRPs, wherein the new TRP is selected based on the measurement report.

15. The method of claim 9, wherein, in the first measurement mode or the second measurement mode, the method further comprises:

receiving, from the network entity, information related to triggering of an event associated with reporting criteria, wherein the information related to the triggering of the event includes information associated with triggering of a first event and a second event, the first event is triggered when disruptions to signal quality become worse than a threshold, and the second event is triggered when signal quality becomes worse than a threshold due to a change in a direction of the UE;

reporting the triggered first event and the triggered second event to the network entity; and one of transmitting the signal informing the switch of downlink (DL) path to the new TRP upon reporting the triggered first event and the triggered second event, or receiving, from the network entity, a mobility command to switch to the new TRP upon reporting the triggered first event and the triggered second event.

16. A user equipment (UE) in a communication system including multiple transmission and reception points (TRPs), comprising:

a transceiver;

memory storing instructions, and at least one processor, comprising processing circuitry, coupled to the transceiver and the memory, wherein the instructions, when executed by the at least one processor, cause the UE to:

receive, from a network entity which controls the multiple TRPs, system information indicating one or more measurement modes supported by the network entity, select a measurement mode among the one or more measurement modes based on one or more UE parameters, transmit, to the network entity, a radio resource control (RRC) connection request for the selected measurement mode, and receive, from the network entity in response to the transmitted RRC connection request, a first RRC connection configuration for configuring the UE with the selected measurement mode.

17. The UE of claim 16, wherein the instructions, when executed by the at least one processor, cause the UE further to:

transmit, to the network entity, UE assistance information indicating a request to change the selected measurement mode while the UE is in an RRC connected state; and receive, from the network entity in response to the transmitted UE assistance information, a second RRC connection configuration for re-configuring the UE with the changed measurement mode.

18. The UE of claim 16, wherein the one or more UE parameters includes at least one of a mobility parameter associated with the UE, a rotation parameter associated with the UE, a power level associated with the UE, a thermal level associated with the UE, or a cluster configuration associated with the UE, wherein information corresponding to the UE cluster configuration indicates whether or not the UE is configured with a TRP cluster.

19. The UE of claim 16, wherein the one or more measurement modes include a first measurement mode, a second measurement mode, a third measurement mode, or a hybrid mode.

20. The UE of claim 19, wherein the instructions, when executed by the at least one processor, cause the UE to:

select, as the measurement mode, the third measurement mode based on one of:

a determination that a UE power level is less than a threshold power level;

a determination that a UE thermal level is greater than a threshold thermal level; or a determination that the UE is not configured with a TRP cluster and UE mobility is greater than a threshold mobility value.

\* \* \* \* \*